United States Patent
Paris et al.

(10) Patent No.: US 9,954,920 B1
(45) Date of Patent: Apr. 24, 2018

(54) DISTRIBUTED SECURE DECODING AND PROCESSING OF BIG DATA STREAMS

(71) Applicant: Centri Technology, Inc., Seattle, WA (US)

(72) Inventors: Luis Gerardo Paris, Maple Valley, WA (US); Michael Patrick Mackey, Lake Stevens, WA (US)

(73) Assignee: Centri Technology, Inc., Seattle, WA (US)

( * ) Notice: Subject to any disclaimer, the term of this patent is extended or adjusted under 35 U.S.C. 154(b) by 0 days.

(21) Appl. No.: 15/710,690

(22) Filed: Sep. 20, 2017

(51) Int. Cl.
| | |
|---|---|
| *G06F 15/16* | (2006.01) |
| *H04L 29/06* | (2006.01) |
| *H04L 9/08* | (2006.01) |
| *H04H 20/10* | (2008.01) |
| *H04L 9/14* | (2006.01) |

(52) U.S. Cl.
CPC ......... *H04L 65/601* (2013.01); *H04H 20/103* (2013.01); *H04L 9/088* (2013.01); *H04L 9/14* (2013.01); *G06F 2221/2141* (2013.01); *H04L 2209/60* (2013.01)

(58) Field of Classification Search
CPC ........... G06F 2221/2141; H04L 9/3236; H04L 2209/60; H04L 63/20; H04L 65/60; H04L 65/607; H04L 9/14
USPC .......................................................... 709/231
See application file for complete search history.

(56) References Cited

U.S. PATENT DOCUMENTS

| | | | |
|---|---|---|---|
| 6,885,748 B1 * | 4/2005 | Wang | G06F 21/10 380/201 |
| 7,917,771 B2 | 3/2011 | Forlenza et al. | |
| 2012/0184202 A1 | 7/2012 | Gadoury | |
| 2012/0204036 A1 | 8/2012 | Wack et al. | |
| 2014/0129824 A1 * | 5/2014 | Paris | H04L 9/0637 713/150 |
| 2014/0359155 A1 | 12/2014 | Wan et al. | |
| 2015/0026462 A1 | 1/2015 | Ramesh et al. | |
| 2017/0031789 A1 * | 2/2017 | Bai | G06F 11/2015 |

OTHER PUBLICATIONS

Official Communication for U.S. Appl. No. 15/402,122 dated Mar. 10, 2017, (19 pages).

* cited by examiner

*Primary Examiner* — Phuoc Nguyen
(74) *Attorney, Agent, or Firm* — John W. Branch; Lowe Graham Jones PLLC

(57) ABSTRACT

Embodiments are directed to a secure MapReduce model for distributed processing and decoding of big data streams. An encoding engine may be employed to divide a data stream into equally sized segments. The segments may be encoded using a document key provided in a set of bundles. The bundles may contain encoded segment metadata, including the document key used to encode the stream. The document key and segment metadata may be encrypted using public key cryptography, and optionally included in the bundles. The encrypted bundles may be embedded into the encoded segments which may be provided to other network computers that include a decoding engine and an application engine. The encrypted bundles may be decrypted to obtain the document key for each encoded segment. The encoded segments may then be decrypted using the document key. And, each decoded segment may be provided to an application engine for further processing.

30 Claims, 12 Drawing Sheets

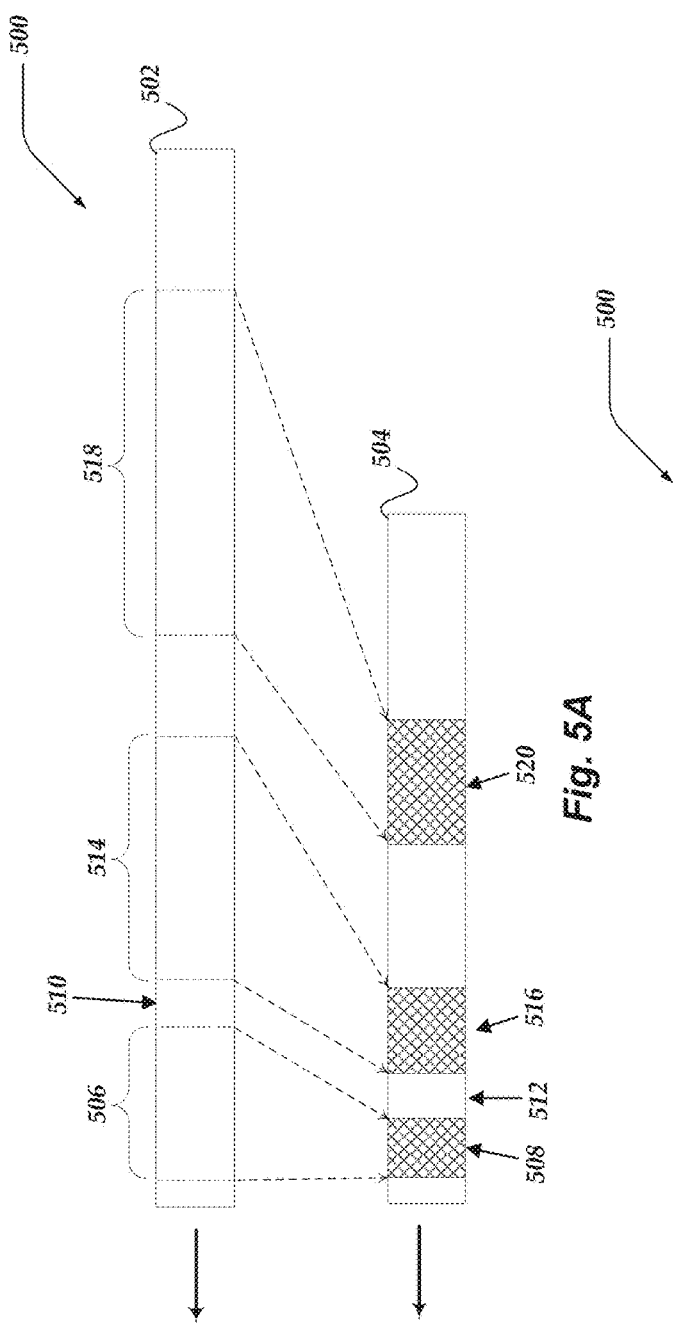
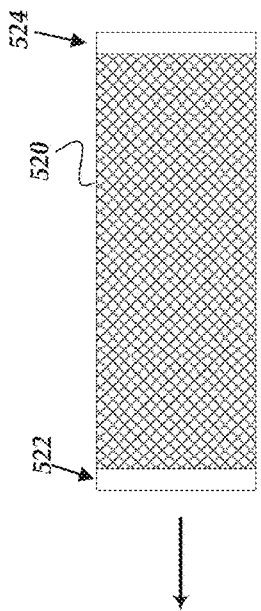

DISTRIBUTED SECURE DECODING AND PROCESSING OF BIG DATA STREAMS

TECHNICAL FIELD

The invention relates generally to distributed decoding and processing of data streams, and more particularly, but not exclusively to secure or optimize distributed decoding and processing of data streams.

BACKGROUND

The advent of the digital age has brought along a myriad of interconnected devices and a plethora of interactive multimedia applications. The space and bandwidth required to drive the data footprint consumed by these applications has also skyrocketed to unprecedented levels. Data is growing so rapidly that the term "big data" was coined to deal with the large data sets that stem from these apps. These large datasets may make it a technological or logistical challenge to perform what once were standard data operations. Accordingly, in some cases, distributed systems that enable multiple hosts or computers to concurrently process large datasets may be employed. However, if encryption or compression and large datasets are used in distributed processing environments, some previously standard data operations may become intractable. Thus, it is with respect to these considerations and others that the subject innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 5A illustrates a logical schematic of a portion of a system that is arranged for providing encoded segments for distributed stream decoding and processing in accordance with at least one of the various embodiments;

FIG. 5B illustrates a logical schematic of a portion of a system that is arranged for providing encoded segments for distributed stream decoding and processing in accordance with at least one of the various embodiments;

DETAILED DESCRIPTION OF VARIOUS EMBODIMENTS

Figure 1:
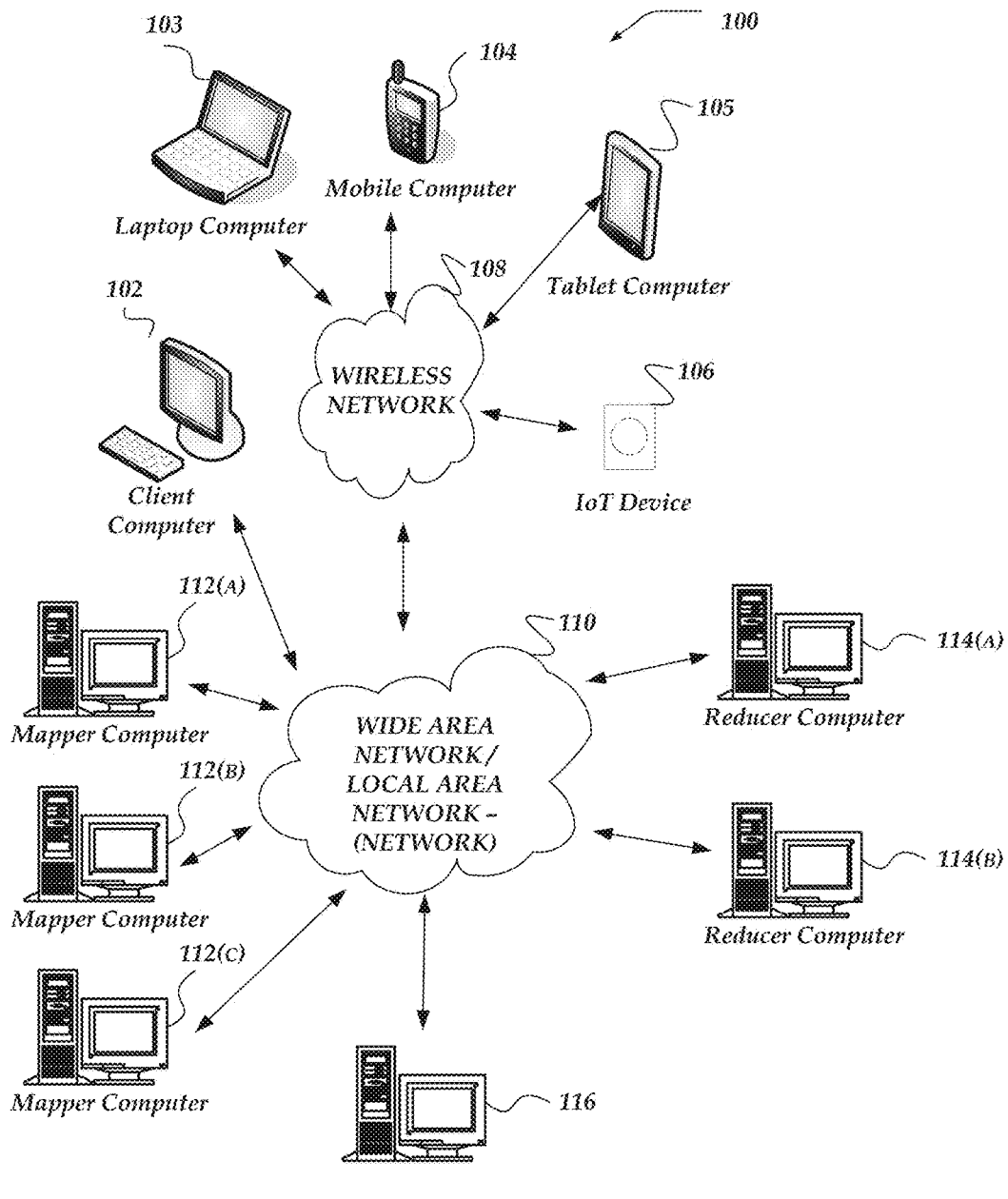
FIG. 1 is a system diagram of an environment in which embodiments of the innovations may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, computers, or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms, "encoding," and "decoding," refer to cryptographic operations that may be performed on data. Generally, encoding may refer to one or more cryptographic operations that may be performed on data to secure it for transmission and/or storage. In some cases, data may be encoded using public key/private key cryptography. In other cases, cryptographic operations may employ symmetric keys. Further, in some embodiments, operations such as compression or decompression may be employed before and/or after data is encoded or decoded. Furthermore, encoding or decoding may comprise compression or decompression, respectively, without applying a cryptographic operation. Accordingly, herein it is assumed that encoding, decoding, and cryptographic operations may include one or more additional steps such as compression, decompression, data padding, data seeding, or the like, or combination thereof.

As used herein the terms, "sequential encoding" refers to encoding where the output of the encoder depends on the previously encoded data. Some sequential encoders may be arranged to have an initial cryptographic state that may be based on one or more cryptographic keys, cryptographic seeding, shared secrets, or the like, or combination thereof. Accordingly, the initial cryptographic state is combined with the initial input data to produce encoded data. However, the sequential encoder may be arranged such that encoding data modifies the cryptographic state of the sequential encoder. Thus, the subsequent portions of input data will be encoded using a cryptographic state that is dependent on the previously encoded portions of the data.

As used herein, "sequential decoding" refers to decoding encoded data that was encoded using a sequential encoding. Accordingly, the encoded data needs to be decoded in the same order it was encoded since there are sequential dependencies introduced by a sequential encoder. Accordingly, the initial cryptographic state of a sequential decoder may be initialized using one or more cryptographic keys, cryptographic seeding, shared secrets, or the like, or combination thereof. But subsequent cryptographic state will depend on the previous cryptographic state and the previous portions of the data being decoded.

As used herein "cryptographic state" refers to data used by encoders or decoders while encoding or decoding data. In some cases, cryptographic state may be comprised of electronic code books, buffered data, pipeline data, counters, cryptographic keys, cryptographic certificates, pseudo random numbers, real random numbers, timers, or the like, or combination thereof. Some encoders or decoders may be arranged to dynamically modify at least a portion of their cryptographic state based on the input data being encoded or decoded.

As used herein "encoder" refers to a software library or hardware processor that is arranged to perform one or more data encoding operations. Encoding operations may include encryption, compression, or the like. Also, encoders may be arranged to perform one or more supporting operations, such as, executing cryptographic hash functions, providing random numbers (e.g., pseudo-random numbers or true random numbers), cryptographic key management, generating shared secrets, cryptographic signing, cryptographic authentication, cipher negotiation, cipher management, or the like, or combination thereof. In some cases, encoders may be built-in to an encoding engine. In other cases, encoders may be separate from the encoding engine. For example, an encoding engine may be arranged to employ one or more encoders built into a hardware security module (HSM). In some embodiments, a single encoder may support more than one cipher suite. In some cases, the cipher suites employed by an encoder may be well-known or otherwise standards based. In other cases, cipher suites may include custom operations. Further, in some cases, encoders that support custom cipher suites may employ one or more well-known or standards based cryptographic operations (e.g., SHA2 hashing, or the like) as part of the custom cipher suite.

As used herein "decoder" refers to a software library or hardware processor that is arranged to perform one or more data decoding operations. Generally, the above definition for encoders applies to decoders except that decoders produce decoded data from encoded data. Further, in some cases, an encoder and a decoder may be part of the same software library or hardware device. In other cases, the encoder and decoder may be separate from each other. Also, decoders should support the same or similar cipher suites as used by the encoder that produce the encoded data.

As used herein "input stream" refers to a source of data that may be provided to an encoding engine for encoding. The term input stream represents the various facilities that may provide the data to an encoding engine, such as, file streams, file handles, network sockets, Unix domain sockets, Windows sockets, pipes, named pipes, message queues, shared buffers, file mappings, databases, distributed data stores, or the like, or combination thereof. For example, an input stream may present data from a very large file or a document file that is provided to an encoding engine using operating system file input/output facilities. Or, the input stream could present data provided by a network socket connected to a remote data source. Herein, for brevity and clarity all sources of data provided to the encoding engine are referred to as input streams.

As used herein "encoded stream" refers to data that is both encoded and provided by an encoding engine. Similar to input streams above, encoded streams represent various facilities that provide encoded data, such as file streams, file handles, network sockets, Unix domain sockets, Windows sockets, pipes, named pipes, message queues, shared buffers, file mappings, databases, distributed data stores, or the like, or combination thereof. The encoding engine may produce the encoded stream and/or save the encoded data.

Herein, for brevity and clarity, encoded data produced by an encoding engine is referred to as an encoded stream. Note, encoded streams may include one or more un-encoded portions as described in detail below.

As used herein "output stream" refers to un-encoded data that may be provided by a decoding engine. Herein, for brevity and clarity all un-encoded data provided by a decoding engine are referred to as output streams. See, input stream above.

As used herein "mapper node" refers to a network computer that is arranged to provide mapping services for a distributed processing system that employs a MapReduce process. Mapper nodes map data (e.g., segment) so it may be provided to particular network computers in a distributed processing cluster.

As used herein "reducer node" refers to a network computer that is arranged to provide reducer services for a distributed processing system that employs a MapReduce process. Reducer nodes process data that have been selected or provided to them by a mapper node in a distributed processing cluster.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing data streams using a network computer, and in particular to secure distributed data stream decoding and processing. In one or more of the various embodiments, a data stream is received, where the data stream was encoded with a sequential encoder to include a plurality of segments encoded with a document key. In one or more of the various embodiments, an encoder state of the sequential encoder was reset to an initial encoding state before each of the plurality of segments was encoded.

In one or more of the various embodiments, metadata generated while the sequential encoder encoded the plurality of encoded segments is appended to a header associated with each segment. In one or more of the various embodiments, the metadata includes a marker label identifying that segment and/or the document key.

In one or more of the various embodiments, each of the plurality of encoded segments is provided to one of a plurality of mapping nodes, typically of a MapReduce software architecture. Each mapping node is thereby enabled to decode the segment and perform a job on the decoded segment.

In one or more of the various embodiments, the document key may be a symmetric key. In one or more of the various embodiments, each of the plurality of mapping nodes is associated with a public/private key pair. In one or more of the various embodiments, the document key is encrypted with the public key of each of the mapping nodes, generating a plurality of encrypted bundles. The encrypted bundles may then be provided to each of the plurality of mapping nodes, enabling mapping nodes to decrypt the document key. In one or more of the various embodiments, a given mapping node attempts to decrypt, using the private key associated with that mapping node, each of the encrypted document key bundles until a bundle generated with the corresponding public key is found. In one embodiment, the bundle generated with the corresponding public key is found when the marker label decoded from the bundle matches the marker label appended to an uncompressed header of the encoded segment. From the corresponding bundle the document key is decrypted.

In one or more of the various embodiments, each bundle may be arranged to include an unencrypted copy of the public key of its associated mapper or reducer. Accordingly, in some embodiments, the public key included in the bundle may be employed as an identifier to allow easier lookups or identification of the bundle, without performing brute-force decryption of the bundles. For example, in some embodiments, public keys may be included in the bundle when there may be such a large number of mappers or reducers that it may be intractable to perform exhaustive decryption to find the corresponding public key. In this example, a mapper or reducer could compare the public key included in each bundle with its own public key to identify which bundle it should try to decrypt with its private key, rather than trying to unencrypt all the bundles exhaustively to find the correct bundle.

In one or more of the various embodiments, the plurality of encoded segments have, when decoded, the same length. This enables seamless integration with certain MapReduce software architectures, such as Hadoop®.

In one or more of the various embodiments, encoding includes compressing, encrypting, or compressing and encrypting a segment of the data stream or an output of a job performed by a mapper computer or reducer computer.

In one or more of the various embodiments, the bundle includes, for each of the plurality of encoded segments, the document key, the marker label, an offset position of the encoded segment within the encoded stream, a size of the encoded segment, and a size of the segment when decoded.

In one or more of the various embodiments, the bundle may optionally include the public key of the corresponding mapper or reducer, in case the number of mappers or reducers becomes intractably high, or for custom configurations or other embodiments.

In one or more of the various embodiments, the bundle is embedded in a header associated with the data stream. Additionally or alternatively, the metadata is stored in a file, database entry, or other storage location associated with the data stream. In one or more of the various embodiments, the marker label is embedded in a header associated with the data stream In one or more of the various embodiments, each of the plurality of mapping nodes encode an output of a MapReduce mapper job performed on a decoded segment of data. In one embodiment the output is encoded using the same document key used to encode the data stream. However, other embodiments, using different document keys are similarly contemplated. In one or more of the various embodiments, the encoded output of the MapReduce job is provided to one of a plurality of reducer nodes in accordance with the MapReduce software architecture (e.g. randomly distributed to one of the plurality of reducer nodes).

In one or more of the various embodiments, each reducer node is also associated with a distinct public/private key pair. The mapping node generates a second plurality of bundles by encrypting the document key with the public key associated with each of the plurality of reducers. Then, each of the plurality of reducer nodes is provided with the second plurality of bundles. Each reducer will attempt to extract the document key from the bundle encrypted with the reducer's corresponding public key.

In one or more of the various embodiments, restoring an encoder to an initial state includes resetting electronic code books, buffered data, pipeline data, counters, cryptographic keys, cryptographic certificates, pseudo random numbers, true random numbers, one or more times, or the like.

In one or more of the various embodiments, an encoding engine may be employed to perform various actions, including, dividing a data stream into one or more segments that have the same size.

In one or more of the various embodiments, the encoding engine may be employed to encode the one or more segments using a document key. In one or more of the various embodiments, the encoding of the one or more segments may include employing a sequential encoder to separately encode the one or more segments. In one or more of the various embodiments, encoding the one or more segments, may include one or more of compressing the one or more segments, encrypting the one or more segments, compressing then encrypting the one or more segments, or compressing and encrypting the one or more segments.

In one or more of the various embodiments, the encoding engine may be arranged to provide one or more bundles that each include the document key.

In one or more of the various embodiments, the encoding engine may be arranged to encrypt the one or more bundles using one or more cryptographic keys that are separate from the document key, such that each of the one or more cryptographic keys are associated with one or more application engines.

In one or more of the various embodiments, the encoding engine may be arranged to embed the one or more encrypted bundles into each of the one or more encoded segments.

In one or more of the various embodiments, the encoding engine may be arranged to provide the one or more encoded segments to one or more other network computers that each include a decoding engine and an application engine.

In one or more of the various embodiments, the decoding engine may be arranged to decrypt the one or more encrypted bundles to obtain the document key for each encoded segment provided to the one or more other network computers. In one or more of the various embodiments, decrypting the one or more encrypted bundles may also include: decrypting each of the one or more encrypted bundles on each of the one or more other computers using a cryptographic key that may be associated with the one or more other computers; and providing the document key from the one or more decrypted bundles that may be decrypted using the cryptographic key.

In one or more of the various embodiments, providing the one or more encoded segments to the one or more other network computers, may include employing a mapping engine to select the one or more other network computers. And, in one or more of the various embodiments, employing the mapping engine to provide the one or more encoded segments to the one or more other network computers. In one or more of the various embodiments, such that the one or more other network computers may be one or more reducer nodes in a distributed processing cluster and the application engine may be a reducer engine.

In one or more of the various embodiments, the decoding engine may be arranged to decode the one or more encoded segments using the document key, such that the one or more decoded segments are the same size as the one or more segments prior to encoding.

And, in one or more of the various embodiments, the decoding engine may be arranged to provide each decoded segment to the application engine for further processing by an application.

In one or more of the various embodiments, providing the data stream to one or more mapper nodes in a distributed processing cluster, such that each mapper node includes the encoding engine and a mapping engine.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, mapper computers 112(A)-(C), reducer computers 114(A)-(B), job tracking computer 116, or the like.

In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing or autonomous computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable or stationary computer capable of connecting to another computer and receiving information such as, laptop computer 103, mobile computer 104, tablet computers 105, or the like. However, portable or stationary computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), physically unclonable functions (PUF), or other device identifiers. Such information may be provided in a network packet, or the like, sent between other client computers, job tracking computer 116, or other computers.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, mapper computers 112(A)-(C), reducer computers 114(A)-(B), job tracking computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of mapper computer 112 is described in more detail below in conjunction with FIG. 3. Briefly, however, mapper computers 112(A)-(C) receive, decode, and process segments of a data stream in accordance with a distributed processing system, such as MapReduce. In one embodiment, the segment is encoded with a document key. The document key is encrypted by job tracking computer 116 using a public key associated with the mapping computer, generating a bundle. If multiple mapping computers with distinct public/private key pairs are used, job tracking computer 116 encrypts the document key with each mapping computer's public key, generating a plurality of bundles, and transmits the plurality of bundles to each of the mapping computers 112(A)-(C), which in turn apply their private key to each of the bundles until the document key is successfully decrypted. Mapper computers 112(A)-(C) are depicted as a trio for purposes of illustration, and are contemplated to occur in any number, limited only by practical constraints.

Aspects of one embodiment of reducer computer 114. While different from mapper computer 112, in that reducer computer 114 performs a reduce function, not a map function, aspects of reducer computer 114 are shared with mapper computer 112, and as such much of the description in conjunction with FIG. 3 also applies to reducer computer 114. Reducer computers 114(A)-(B) are depicted as a pair for purposes of illustration only, and are contemplated to occur in any number, greater, less than, or equal to the number of mapper computers 112, and limited only by practical constraints.

One embodiment of job tracking computer 116 is described in more detail below in conjunction with FIG. 3. Briefly, however, job tracking computer 116 includes virtually any network computer that is specialized to manage the provision and execution of distributed processing services as described herein, including securely distributing segmented data streams for decoding and processing on mapper and/or reducer computers of a MapReduce software architecture.

Although FIG. 1 illustrates mapper computer 112, reducer computer 114, and job tracking computer 116 as single computers, the innovations and/or embodiments are not so limited. For example, one or more functions of mapper computer 112, reducer computer 114, or job tracking computer 116, or the like, may be distributed across one or more distinct network computers. Moreover, mapper computer 112, reducer computer 114, or job tracking computer 116 is not limited to a particular configuration such as the one shown in FIG. 1. Thus, in one embodiment, mapper computer 112, reducer computer 114, or job tracking computer 116 may be implemented using a plurality of network computers. In other embodiments, mapper computer 112, reducer computer 114, or job tracking computer 116 may be implemented using a plurality of network computers in a cluster architecture, a peer-to-peer architecture, or the like. Further, in at least one of the various embodiments, mapper computer 112, reducer computer 114, or job tracking computer 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
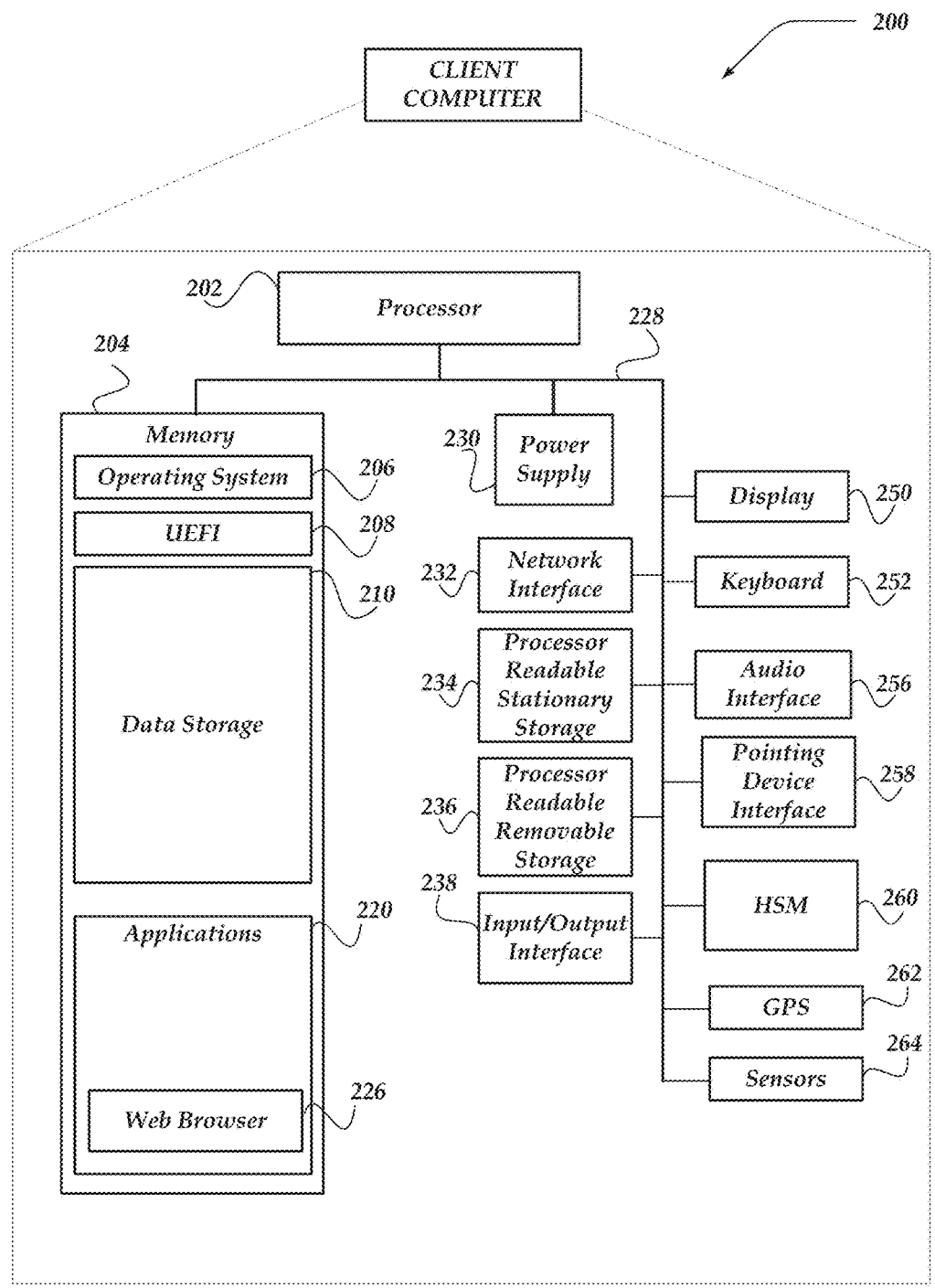
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of mobile computers or client computers shown in FIG. 1.

As shown in the figure, client computer 200 includes a processor 202 in communication with a memory 204 via a bus 228. Client computer 200 also includes a power supply 230, network interface 232, audio interface 256, global positioning systems (GPS) receiver 262, display 250, keyboard 252, input/output interface 238, processor-readable stationary storage device 234, and processor-readable removable storage device 236. Power supply 230 provides power to mapper computer 200. In some embodiments, processor 202 may be a multiprocessor system that includes one or more processors each having one or more processing/execution cores.

Network interface 232 includes circuitry for coupling mapper computer 200 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 232 is sometimes known as a transceiver, transceiving device, or network interface card (NIC). Client computer 200 may optionally communicate with a base station (not shown), or directly with another computer.

Audio interface 256 is arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, for example, using voice recognition.

Display 250 may be a liquid crystal display (LCD), gas plasma, electronic ink, light emitting diode (LED), Organic LED (OLED) or any other type of light reflective or light transmissive display that can be used with a computer. Display 250 may be a handheld projector or pico projector capable of projecting an image on a wall or other object.

Figure 3:
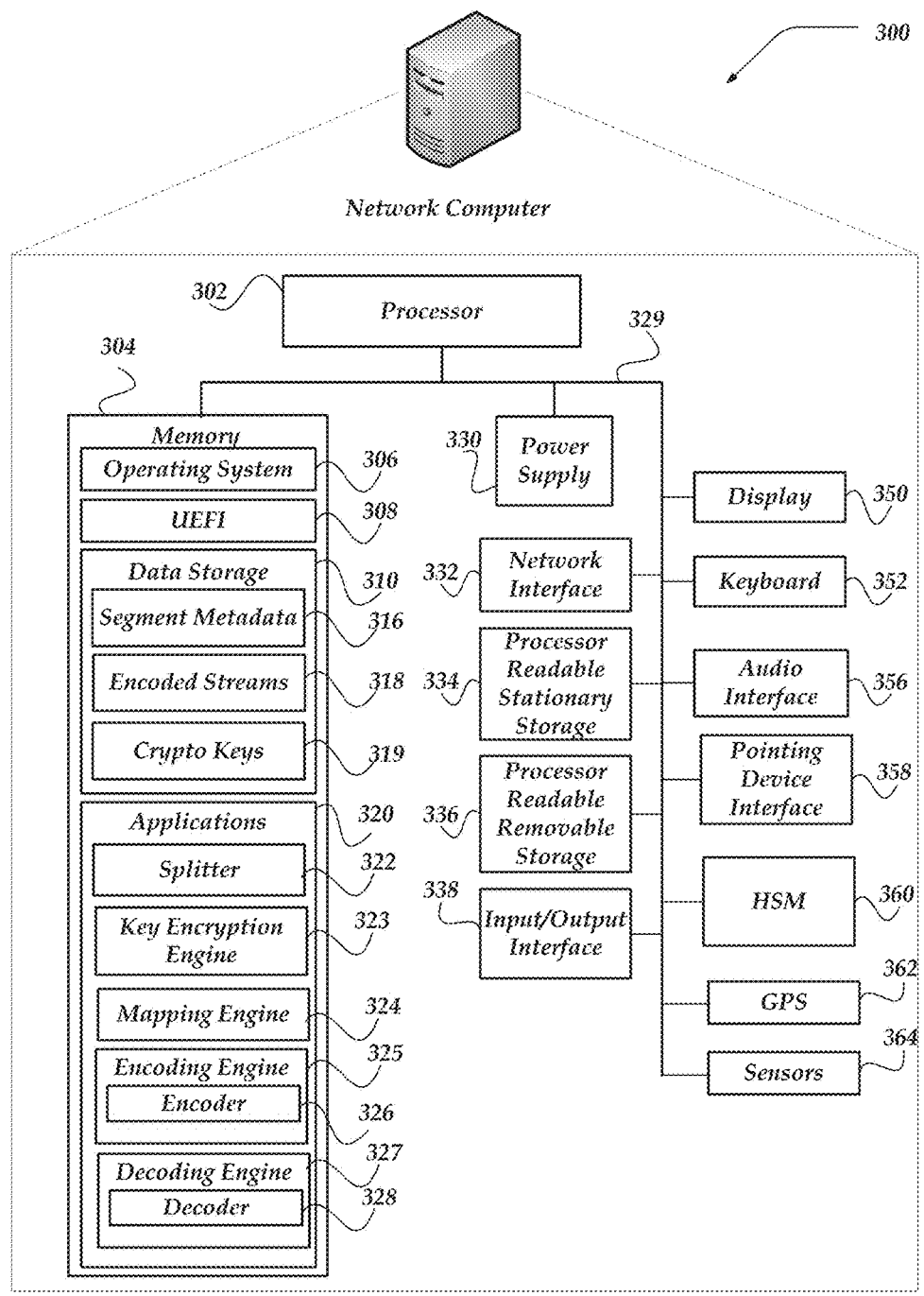
FIG. 3 shows an embodiment of a network computer that may be included in a system such as that shown in FIG. 1.

Client computer 200 may also comprise input/output interface 238 for communicating with external devices or computers not shown in FIG. 3. Input/output interface 238 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 262 can determine the physical coordinates of client computer 200 on the surface of the Earth, which typically outputs a location as latitude and longitude values. GPS transceiver 262 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 262 can determine a physical location for client computer 200.

Client computer 200 may also include sensors 264 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 264 may be one or more hardware sensors that collect and/or measure data that is external to client computer 200

In at least one embodiment, however, client computer 200 may, through other components, provide other information that may be employed to determine a physical location of the client computer, including for example, a Media Access Control (MAC) address, IP address, and the like.

Human interface components can be physically separate from client computer 200, allowing for remote input and/or output to client computer 200. For example, information routed as described here through human interface components such as display 250 or keyboard 252 can instead be routed through the network interface 232 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 258 to receive user input.

Memory 204 may include Random Access Memory (RAM), Read-Only Memory (ROM), and/or other types of non-transitory computer readable and/or writeable media. Memory 204 illustrates an example of computer-readable storage media (devices) for storage of information such as computer-readable instructions, data structures, program modules or other data. Memory 204 stores a unified extensible firmware interface (UEFI) 208 for controlling low-level operation of client computer 200. The memory also stores an operating system 206 for controlling the operation of client computer 200. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 204 may further include one or more data storage 210, which can be utilized by client computer 200 to store, among other things, applications 220. In one embodiment, at least some of data storage 210 might also be stored on another component of client computer 200, including, but not limited to, non-transitory media inside processor-readable removable storage device 236, processor-readable stationary storage device 234, or any other computer-readable storage device within client computer 200, or even external to client computer 200.

Applications 220 may include computer executable instructions which, when executed by client computer 200, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 220 may include Web Browser 226, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 262. Also, in some embodiments, geolocation information may include information provided using one or more geo-location protocols over the networks, such as, wireless network 108 and/or network 110.

Furthermore, in at least one of the various embodiments, applications 220, or the like, may be operative in a cloud-based computing environment. In at least one of the various embodiments, in this context applications may flow from one physical network computer within the cloud-based environment to another depending on performance and scaling considerations automatically managed by the cloud computing environment. Likewise, in at least one of the various embodiments, virtual machines and/or virtual servers may be provisioned and de-commissioned automatically.

Further, in some embodiments, client computer 200 may also include hardware security module (HSM) 260 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 260 may be arranged as a hardware card that may be installed in a network computer.

Additionally, in one or more embodiments (not shown in the figures), client computer 200 may include one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of mapper computer 112, reducer computer 114, or job tracker computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. Data storage 310 may also be employed to store segment metadata 316, encoded streams 318, and crypto keys 319. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

In one or more of the various embodiments, segment metadata 316, discussed below in conjunction with FIG. 7, may include at least a marker label, an offset position of the encoded segment within the encoded stream, a size of the encoded segment, and an unencoded size of the segment. Segment metadata 316 is typically generated by a sequential encoder performing a single pass encoding, including a real-time encoding, as the sequential encoder may be arranged to segment the input data stream into encoded segments.

In one or more of the various embodiments, each of encoded streams 318 contain a plurality of encoded segments, as discussed below in conjunction with FIGS. 4-6. Each of these segments is encoded by a sequential encoder while encoding an input data stream, where upon encountering a beginning of a segment, the encoder is reset to an initial encoding state, e.g. an initial cryptographic state. By encoding the input data stream in segments, a sequential decoder is enabled to decode an arbitrary segment without first decoding all prior segments in the data stream.

Figure 9:
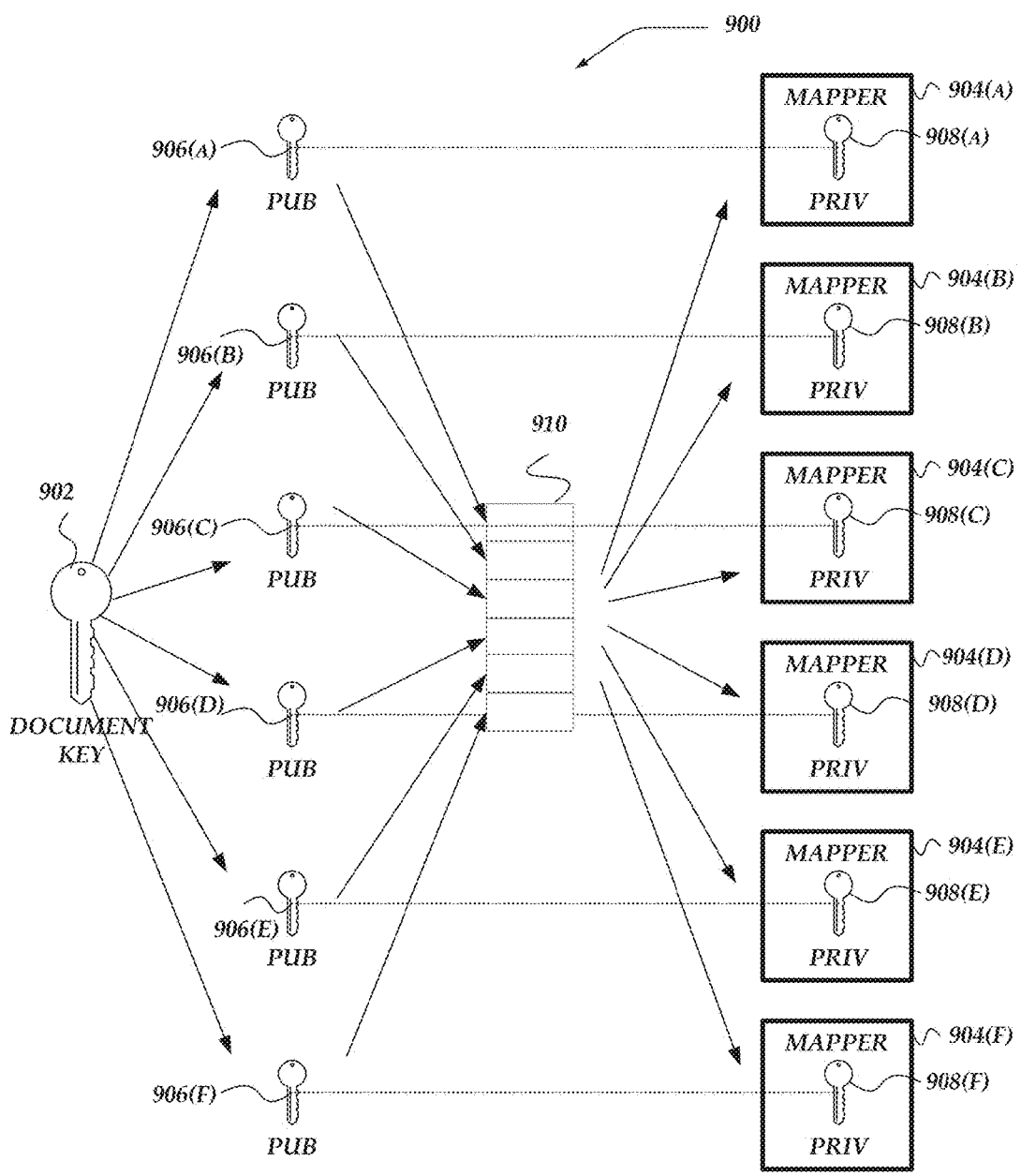
FIG. 9 illustrates a logical schematic of a portion of a system, including encryption of a document key by multiple public keys, and distributing the resulting plurality of bundles to each of the mappers in accordance with one or more of the various embodiments.

In one or more of the various embodiments, cryptographic keys 319, as discussed below in conjunction with FIG. 9, are associated with one or more of mapper computers, e.g. mapper computers 112(A)-(C) as depicted in FIG. 1. In one or more of the various embodiments, key encryption engine 323 uses the stored cryptographic keys to encrypt a document key into a plurality of bundles, each of which is provided to a plurality of mapping computers 112(A)-(C) for decryption and processing.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include splitter 322, key encryption engine 323, mapping engine 324, encoding engine 325, decoding engine 327, other applications, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In one or more of the various embodiments, encoding engine 325 receives a data stream and splits it into a plurality of segments for distributed decoding and processing. In one embodiment, encoding engine 325 uses information contained in segment metadata 316 to identify segments within the data stream. Encoded segments are then transmitted to a plurality of mapper computers, e.g. mapper computers 112 (A)-(C) for decoding and processing.

In one or more of the various embodiments, key encryption engine 323 uses crypto keys 319 to encrypt a document key, where the document key is usable to decode encoded segments of the data stream. Key encryption engine 323 may encrypt the document key using each of cryptographic keys 319, creating a plurality of bundles, each of which is transmitted to each of the mapper computers 112(A)-(C) for decoding and processing.

In at least one of the various embodiments, applications, such as, splitter 322, key encryption engine 323, mapping engine 324, encoding engine 325, decoding engine 327, other applications, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 110.

Furthermore, in at least one of the various embodiments, splitter 322, key encryption engine 323, mapping engine 324, encoding engine 325, decoding engine 327, other applications or the like, may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to splitter 322, key encryption engine 323, mapping engine 324, encoding engine 325, decoding engine 327, other applications, or the like, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like, such as cryptographic keys 319. In some embodiments, HSM 360 may be arranged as a hardware card that may be installed in a network computer.

Additionally, in one or more embodiments (not shown in the figures), network computer 300 may include one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
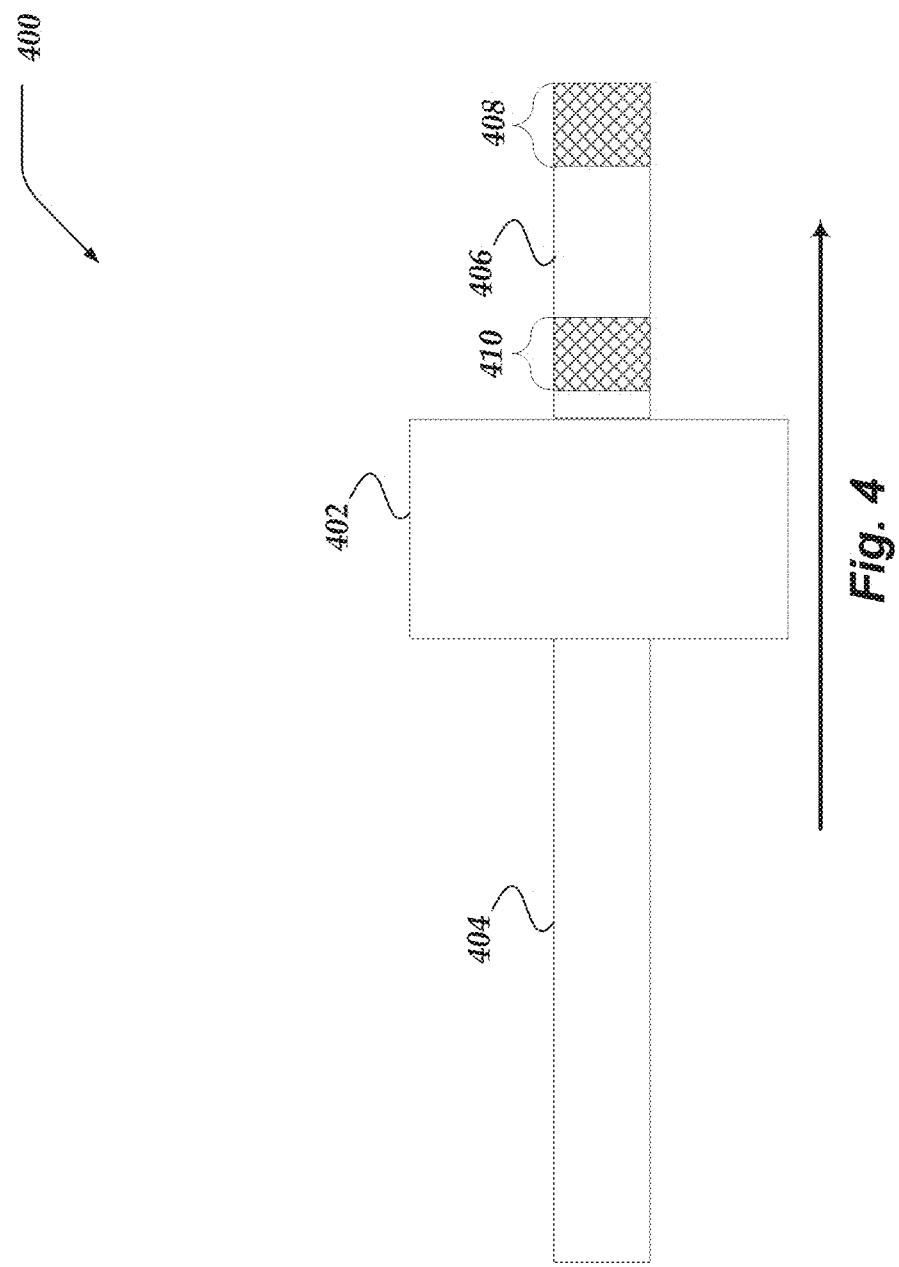
FIG. 4 illustrates a logical schematic of a system that is arranged for providing distributed stream decoding and processing in accordance with at least one of the various embodiments.

FIG. 4 illustrates a logical schematic of system 400 that is arranged for providing distributed stream decoding and processing in accordance with one or more of the various embodiments. In one or more of the various embodiments, a data coding server computer, such as job tracker computer 116 or mapper computer 112 may be arranged to encode or decode data.

In some embodiments, the data coding server may be arranged to provide one or more segment markers that may enable users or applications to seek, identify or search for particular portions of the encoded data without having to decode the encoded payload/content of the encoded data. Further, in one or more of the various embodiments, if sequential encoding was used to encode the data, the segment markers may enable a sequential decoder to decode the encoded segment associated with a segment marker without having to decode the entire encoded file.

In one or more of the various embodiments, a data coding server computer 402 may be provided an input stream, such as input stream 404 for encoding. In one or more of the various embodiments, data coding server computer 402 may encode input stream 404 to provide encoded stream 406. Accordingly, in one or more of the various embodiments, encoded stream 406 may be provided to another server or service for storage, or it may be stored local to data coding server computer 402.

In one or more of the various embodiments, data coding server computer 402 may be arranged to encode portions of input stream 404 while leaving other portions of input stream 406 un-encoded. Accordingly, in one or more of the various embodiments, encoded segment 408 and encoded segment 410 represent encoded portions of encoded stream 406. In some embodiments, these segments may be encoded by an encoder engine, such as encoder engine 222 (in FIG. 2), or the like. As described above, the encoding may include encryption, compression, or the like, or combination thereof.

In one or more of the various embodiments, segment markers may be inserted in the encoded stream to demark the encoded segments. Further, the encoding engine may provide segment metadata that corresponds to some or all of the encoded segments.

In one or more of the various embodiments, the encoding engine may be arranged to enable external applications (e.g., external to the encoding engine) to trigger if or when segment markers may be injected to the encoded stream. Thus, in some embodiments, the particular portions of input stream 404 that are encoded may be selected by the external applications.

In one or more of the various embodiments, the encoding engine may be arranged to automatically inject segment markers according to one or more rules or configurations.

FIG. 5A illustrates a logical schematic of a portion of system 500 that is arranged for providing encoded segments for distributed stream decoding and processing in accordance with one or more of the various embodiments. FIG. 5A shows additional detail about encoded streams, encoded segments, segment markers, and so on.

In one or more of the various embodiments, input stream 502 represents an un-encoded stream of data that may be provided to an encoding engine, such as encoding engine 325. In some embodiments, input stream 502 may be a stream such that it may be a real-time stream or it may be a file stream.

In one or more of the various embodiments, encoded stream 504 represents an encoded stream that may be provided by an encoding engine, such as encoding engine 325. In this example, encoded stream 504 includes three marked encoded segments. Accordingly, input stream portion 506 corresponds to encoded segment 508. Likewise, in this example, input stream portion 510 corresponds to encoded stream portion 512. In this example, input stream portion 510 may be designated such that it may be unlabeled or unmarked data that may be encoded or un-encoded. Likewise, the unreferenced portions of input stream 502 and encoded stream 504 may be considered to be unlabeled or unmarked stream portions that may be encoded or un-encoded. However, in this example, they may be considered to be unmarked or unlabeled stream portions.

Further, in this example: input stream portion 514 corresponds to encoded segment 516; and input stream portion 518 corresponds to encoded segment 520.

FIG. 5B illustrates a logical schematic of a portion of system 500 that is arranged for providing encoded segments for distributed stream decoding and processing in accordance with one or more of the various embodiments. FIG. 5B shows additional detail about encoded segments, and segment markers. In this example, encoded segment 520 is shown with additional detail of segment marker 522 and segment marker 524. In one or more of the various embodiments, segment markers, such as segment marker 522 and segment marker 524 serve as boundaries for encoded segment 520. Accordingly, in one or more of the various embodiments, a decoding engine may discover the segment markers during decoding and respond appropriately.

In one or more of the various embodiments, if an encoding engine is about to start a next encoded segment it may be arranged to reset its cryptographic state to the initial or start state. For example, this may involve clearing an encoder's current electronic codebooks (ECBs, or the like, and then generating initial state ECBs using known predetermined keying material. Note, in some embodiments, the encoder may be arranged to overwrite a previous cryptographic state with the initial state information rather than "clearing" the state information. Note, the particular encoder used by the encoding engine will control the details of how to establish an initial cryptographic state. In some cases, the encoder may be an external service or library that provides an API for triggering a reset to restore the encoder to an initial state.

In one or more of the various embodiments, the encoder may be a non-sequential encoder or it may otherwise not be configured to use a sequential cipher. Accordingly, for non-sequential encoders the segment markers may not trigger a reset to initial state since it may be unnecessary.

In one or more of the various embodiments, segment markers, such as segment marker 522 may be associated with arbitrary labels or tag information that may be discovered without decoded and encoded stream. In one or more of the various embodiments, applications that trigger the insertion of segment markers may provide label information that may be associated with the segment markers. In one or more of the various embodiments, there may be one or more reserved labels that may be reserved for segment markers provided automatically by the encoding engine.

In one or more of the various embodiments, the label information may be embedded in the encoded stream with the marker. In some embodiments, the label information may be kept in a separate segment metadata file and referenced using an index value or other shortened identifier.

In one or more of the various embodiments, encoding engines may include closing segment markers such as segment marker 524 that may be used for indicating the end of an encoded segment. Accordingly, in one or more of the various embodiments, a decoding engine may be arranged to discover encoded segment based on a start segment marker, such as segment marker 522 and discover the end of an encoded segment based on its closing segment marker, such as segment marker 524. In some embodiments, the closing segment marker may be omitted.

In one or more of the various embodiments, if an encoding engine finishes encoding an encoded segment it may be arranged to provide additional segment information that is associated with the segment and store it in segment metadata (not shown here, see FIG. 7), such as those that may be stored in segment metadata 316. In one or more of the various embodiments, the segment information may include information that may be sufficient for a decoding engine, such as decoding engine 326 to discover the segment and decode it correctly.

In one or more of the various embodiments, segment information may include various data fields, such as, segment label, starting offset position within the encoded stream, encoded data size, un-encoded data size, or the like.

Figure 6A:
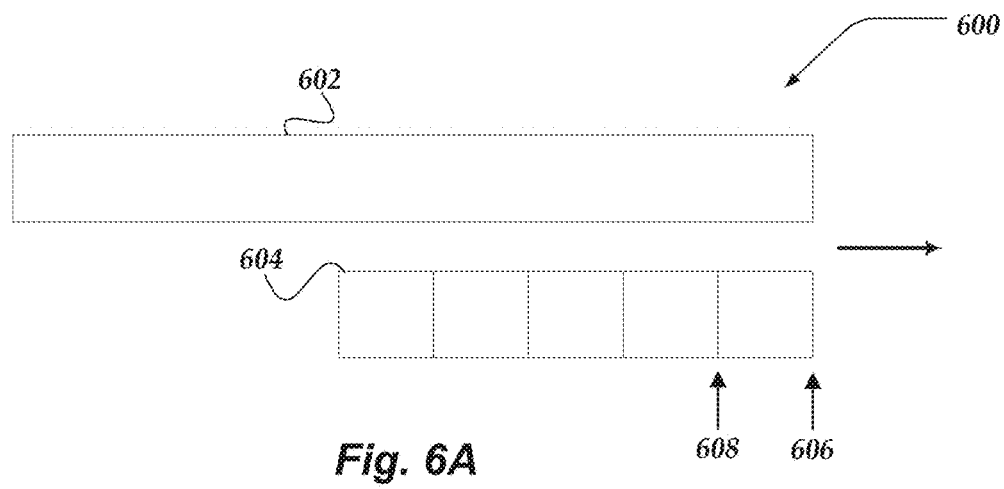
FIG. 6A illustrates a logical schematic of a portion of a system that is arranged for providing encoded segments for distributed stream decoding and processing in accordance with at least one of the various embodiments.
Figure 6B:
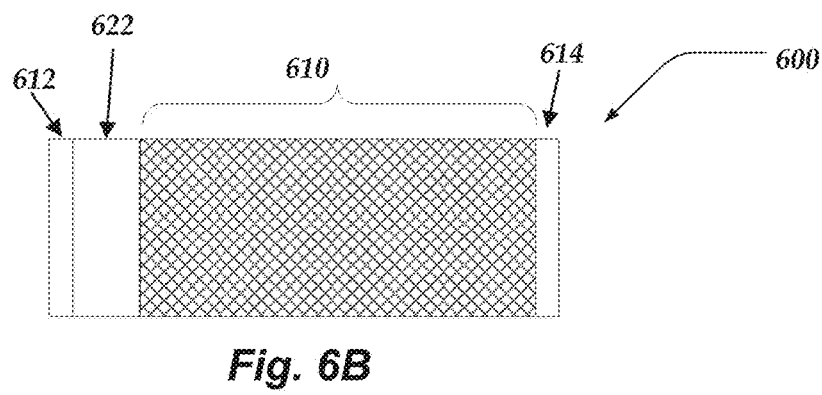
FIG. 6B illustrates a logical schematic of a portion of a system that is arranged for providing markers for segmenting large-sized encoded documents in accordance with one or more of the various embodiments.
Figure 6C:
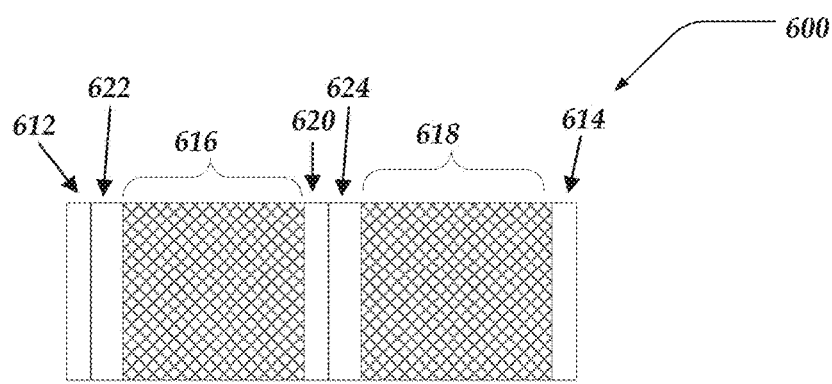
FIG. 6C illustrates a logical schematic of a portion of a system that is arranged for providing encoded segments for distributed stream decoding and processing in accordance with one or more of the various embodiments.

FIGS. 6A-6C show additional detail about encoded streams, encoded segments, and segment markers, and so on.

FIG. 6A illustrates a logical schematic of a portion of system 600 that is arranged for providing encoded segments for distributed stream decoding and processing in accordance with one or more of the various embodiments. In one or more of the various embodiments, an input stream such as input stream 602 may be provided to an encoding engine, such as encoding engine 325. Accordingly, the encoding engine may be arranged to provide encoded stream 604.

In one or more of the various embodiments, encoding engines may be arranged to automatically insert segment markers (and encoded segment) into an encoded stream. For example, the encoding engine may be configured to insert a segment marker for every 64 KB of the input stream. In other embodiments, the encoding engine may be arranged to insert a segment marker each second to act as a timestamp. In this example, segment marker 606 and segment marker 608 may represent segment markers that may have been automatically inserted into encoded stream 604.

In one or more of the various embodiments, the length of each encoded segment is not necessarily the same since each encoded segment may have different compression gains. In one or more of the various embodiments, this may be true even if the input stream segments are the same size.

FIG. 6B illustrates a logical schematic of a portion of system 600 that is arranged for providing markers for segmenting large-sized encoded documents in accordance with one or more of the various embodiments. In one or more of the various embodiments, encoded segment 610 may be part of an encoded stream. In some embodiments, segment marker 612 may be a segment marker at the beginning of encoded segment 610. And, in some embodiments, segment marker 614 may represent a closing segment marker or the segment marker for the next encoded segment.

In one or more of the various embodiments, FIG. 6B illustrates a plurality of encrypted bundles 622 embedded by job tracker computer 116 into encoded segment 610 for distribution to a mapper computer 112. While encrypted bundles 622 are depicted between segment marker 612 and encoded segment 610, this is for illustration purposes only, and any ordering (e.g. encoded segment 610 before encrypted bundles 622) is similarly contemplated. Also, in one or more of the various embodiments, the encrypted bundles may be included in a second metadata file rather than within the encoded segment as side channel data. The second metadata file, if any, should be separate from the marker metadata file (for binary vs. text incompatibilities and file seek performance reasons).

In one embodiment, encrypted bundles 622 (and encrypted bundles 624, as depicted in FIG. 6C) are generated by job tracker computer 116 based on encoded segments of a data stream, such as encoded data stream 504. Encrypted bundles 622 are discussed in more detail below in conjunction with FIG. 9, but briefly, each bundle includes one or more of document key 902, segment marker 612, segment metadata 700 and/or other keying information associated with encoded segment 610.

In one or more of the various embodiments, each of the plurality of bundles is encrypted with one of public keys 906, such that the plurality of encrypted bundles 622 includes one bundle for each of mapper computers 112, i.e., each of mapper computers 112 is associated with a distinct public/private key pair, and job tracker computer 116 encodes a bundle for each mapper computer using the corresponding public key. In addition to encrypting bundles with different public keys, job tracker computer 116 may include different information in each bundle. For example, while document key 902 may be the same for each bundle, segment marker 612 and segment metadata 700 may differ in that each bundle includes a segment marker and/or segment metadata associated with the corresponding encoded segment.

In one or more of the various embodiments, as discussed above, each encoded segment is distributed for processing to a different mapper computer, having a distinct public/private key pair. However, it is also contemplated that the plurality of encoded segments may be distributed for processing over a smaller number of mapper computers, such that at least one mapper computer processes more than one encoded segment. In these scenarios, one or more bundles may be encrypted with the same public key, as splitter 322 will distribute multiple encoded segments to the same mapper computer for processing. At the same time, segment marker 612 will continue to be distinct for each bundle, as segment marker 612 is determined based on how the input data stream was segmented, not which mapper computer the segment is processed on.

In one or more of the various embodiments, during encoding if a segment marker is being inserted, the encoding engine may be arranged to reset its encoder to an initial cryptographic state before producing encoded segment 610. Thus, in this example, if the encoder is a sequential encoder, the encoding of encoded segment 610 may be sequentially dependent on the first byte of the encoded segment. Accordingly, to decode the segment completely and correctly, the decoder may be arranged to reset itself to the initial cryptographic state to decode the contents of encoded segment 610. For example, assuming sequential encoding, if encoded segment 610 corresponds to 64 KB (or other configurable segment size) of the input stream (not shown), the bytes of encoded data starting at the beginning of the segment (just after segment marker 612) must be decoded in sequential order to successfully decode the last bytes of the segment (just before segment marker 614). Decoding out of order or starting from the someplace other than the beginning of encoded segment 610 will produce incorrect results. Note, in some embodiments, if the encoder may be using non-sequential encoding, there may be conditions that enable portions of the segment to be decoded out-of-order.

FIG. 6C illustrates a logical schematic of a portion of system 600 that is arranged for providing encoded segments for distributed stream decoding and processing in accordance with one or more of the various embodiments. In one or more of the various embodiments, an encoding engine may be arranged to insert one or more segment markers into an encoded stream that already includes encoded segments. Or, in some embodiments, the encoding engine may be arranged to insert a segment marker inside of an encoded segment.

For example, in some embodiments, an encoding engine may be arranged or configured to automatically insert segment markers into the encoded stream every 64 KB (or other configurable segment size) of the input stream. Accordingly, in some embodiments, an application or a user can insert their own application specific segment marker into the encoded stream and even coexist with an encoded segment already defined by the automatically inserted segment markers.

In another example, in some embodiments, an application may request to insert a new segment marker into a previously generated encoded stream that already includes one or more encoded segments. Accordingly, in one or more of the various embodiments, the encoding engine may insert the new segment marker into an existing encoded segment.

Accordingly, in one or more of the various embodiments, if a segment marker may be inserted into an encoded segment, during the encoding of the stream, the current encoded segment may be ended and closed before the new segment marker is inserted. Thus, in one or more of the various embodiments, the encoding engine may insert the new marker and reset its encoder to its initial cryptographic state. The remainder of the segment may be encoded starting at the position of the new marker.

In one or more of the various embodiments, if the encoded stream was previously generated, adding the new segment marker may be more complicated. In some embodiments, the decoding engine may locate the segment markers that enclose the encoded segment where the new segment marker may be added. Accordingly, the decoding engine may decode the entire segment and provide the entire decoded segment to the encoding engine. The encoding engine may then re-encode the first part of the segment, insert the new segment marker, and encode the second part of the segment.

For example, in some embodiments, encoded segment 616 and encoded segment 618 represent a view of how encoded segment 610 may be modified if an additional segment marker, such as segment marker 620 may be added to the encoded stream. Here, in this example, the new segment marker, segment marker 620 effectively divides the formerly encoded segment 610 into two segments, encoded segment 616 and encoded segment 618. Note, this example also represents the outcome of the case where the encoding engine may be configured to insert segment markers at every 64 KB (or other configurable segment size) of the input stream. At least one difference between on-the-fly generation and modifying a previously generated encoded stream is that the two encoded segments (e.g., encoded segment 616 and encoded segment 618) may be generated on-the-fly by the encoding engine without the need to decode the formerly encoded segment 610.

In one or more of the various embodiments, if a previously generated encoded stream is being modified by inserting additional segment markers, the segment metadata for the encoded stream may need to be updated to reflect changes. In one or more of the various embodiments, if an additional segment marker was added, the segment metadata may be updated to include the new segment marker and its associated information.

Likewise, in some embodiments, adding a new segment marker to the segment metadata may require the encoding engine to "fixup" the metadata entries for markers that come after the modified/added segments. In one or more of the various embodiments, if the modifications result in the affected encoded segments to change size, the offset values of the encoded segments that come after the modifications may require correcting. For example, for some embodiments, if encoded segment 610 is 64 KB, the next encoded segment will begin +64 KB (assuming offset in terms of bytes) after the start of segment 610. Continuing with this example, since the addition of segment marker 620 generates segment 616 and segment 618, if the sum of their sizes is not equal to 64 KB the offset values (possibly stored in the encoded stream's segment metadata) for subsequent segments in the encoded stream may require updating/correcting.

In one or more of the various embodiments, if a modification results in smaller encoded segments, the encoding engine may be arranged to add null padding to the modified encoded segments (e.g., segment 616 or segment 618) to avoid requiring offset updates to the segment metadata. However, if the modifications increase the size(s), the offset value for subsequent encoded segment in an existing encoded stream may be updated to reflect the shift caused by the change in size.

Figure 7:
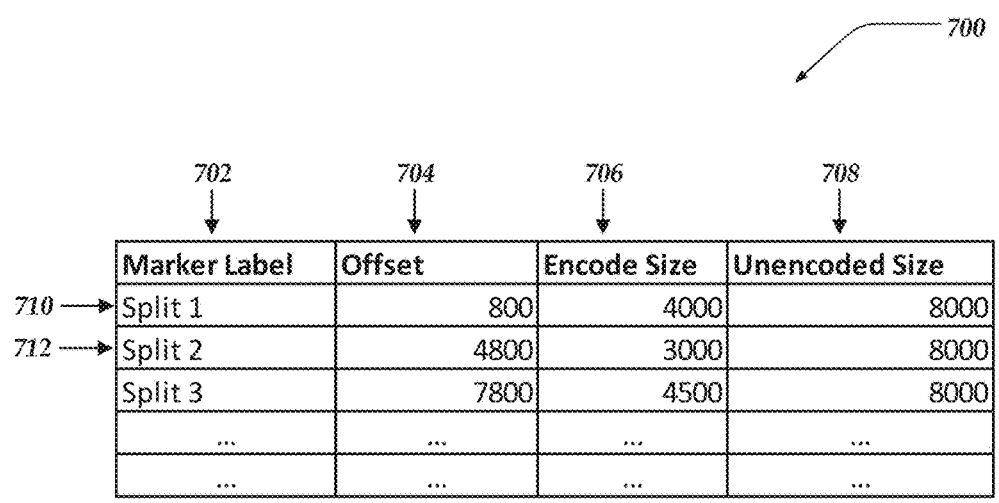
FIG. 7 illustrates a logical schematic of a portion of segment metadata for storing segment markers information for encoded segments for distributed stream decoding and processing in accordance with one or more of the various embodiments.

FIG. 7 illustrates a logical schematic of a portion of segment metadata 700 for storing segment markers information for encoded segments for distributed stream decoding and processing in accordance with one or more of the various embodiments. In one or more of the various embodiments, segment metadata, such as segment metadata 700 include information that supports fast lookups of encoded segments in an encoded stream (e.g. encoded document). In one or more of the various embodiments, segment metadata may be data structures that include marker information for each segment marker.

In one or more of the various embodiments, segment metadata may be arranged to be extensible data structures that enable one or more additional fields or custom fields to the included in segment metadata. For example, in some embodiments, one or more fields of segment metadata may be compound fields that may be arranged to include one or more named value pairs, or the like.

In one or more of the various embodiments, segment metadata, such as segment metadata 700 may include one or more fields, such as marker label 702, offset 704, encoded size 708, un-encoded size, or the like. For example, in some embodiments, in row 710 the marker information includes a marker label set to "Split 1", an offset value of 800, encoded size of 4000 bytes, and an un-encoded size of 8000 bytes. Likewise, for example, in row 712 the marker information includes a marker label set to "Split 2", an offset value of 4800, encoded size of 3000 bytes, and an un-encoded size of 8000 bytes.

In one or more of the various embodiments, the marker label may be an arbitrary string value. In some embodiments, the encoding engine may be arranged to employ configuration information to enforce one or more constraints, such as maximum string length, one or more special or excluded characters, one or more reserved words, or the like, or combination thereof.

In one or more of the various embodiments, applications that the use the encoding engine may provide a label value when requesting to add segment markers. Accordingly, in some embodiments, except for the constraints discussed above, the encoding engine sets the label value as requested.

In one or more of the various embodiments, the offset value indicates the starting location of the encoded segment within the encoded stream. Accordingly, in some embodiments, the decoding engine may use the offset value to determine where to seek within the encoded stream to locate a particular encoded segment. In one or more of the various embodiments, the offset value may be computed by the encoding engine after the segment is encoded and closed. In one or more of the various embodiments, the offset value may be computed or recorded in terms of bytes, words, blocks, or the like.

In one or more of the various embodiments, the encoded size value indicates the size of the encoded segment in terms of space used in storage media or memory (e.g., bytes, words, blocks, or the like). Likewise, in one or more of the various embodiments, un-encoded size indicates the size of the segment before it was encoded.

In one or more of the various embodiments, segment metadata may be maintained separate from the encoded stream. In some embodiments, segment metadata may be pre-pended or appended to its associated encoded stream. Further, in some embodiments, the segment metadata information may be embedded directly with the segment marker. Still further, in some embodiments, the segment metadata information may be both embedded with the segment markers and stored separately.

In one or more of the various embodiments, the segment metadata may be implemented using various data structures or formats, such as database tables, arrays, trees, XML files, JSON files, or the like, or combination thereof.

Figure 8:
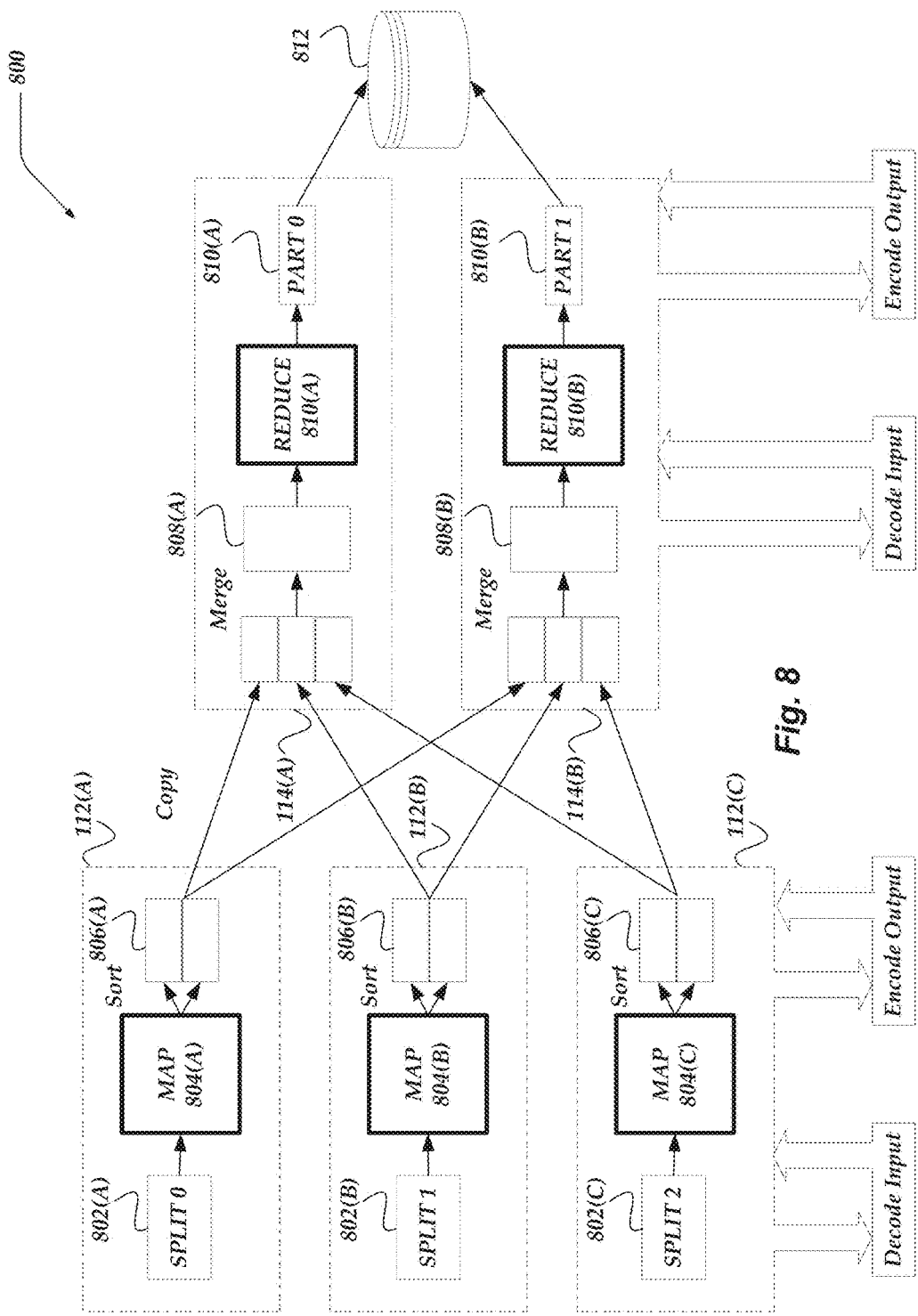
FIG. 8 illustrates a logical schematic of a portion of a system containing the optimized MapReduce architecture for secure distributed processing of encoded segments in accordance with one or more the various embodiments.

FIG. 8 illustrates a logical schematic of a portion of system 800 for distributed processing of encoded segments in accordance with one or more of the various embodiments. In some embodiments, the distributed processing may be performed using a MapReduce system as modified by aspects of the innovation included herein, as well as indications where encoding and decoding may be utilized.

Mapper computers 112(A)-(C) include data splits 802(A)-(C), where each split is associated with a segment of the encrypted data stream. In one or more of the various embodiments, Data splits 802(A)-(C) are encoded, and must first be decoded in accordance with FIG. 11 before MAPs 804(A)-(C), implemented by mapping engine 324 of FIG. 3, can apply the decoded segment to a job.

The outputs of each job are sorted into outputs 806(A)-(C). The sorted output may be encoded, such as with encoding engine 325 of FIG. 3, before being copied to one of the reducing computers 114(A) or 114(B). Mapping computers 112(A)-(C) may also encrypt the document key used to encode the job output, and provide the encrypted document key to each of reducing computers 114(A)-(B). In one or more of the various embodiments, when each reducer is associated with a distinct private key, the mapping computer generates a second plurality of bundles by encrypting the document key with public keys associated with each of the reducer computers. The mapper computer then provides the second plurality of bundles to each of the reducer computers.

Reducer computers 114(A)-(B) decrypt the document key in a manner similar to how mapper computers 112(A)-(C) decrypt document keys from the plurality of bundles received from job tracker computer 116—by attempting to decrypt each bundle until the bundle encrypted with the corresponding public key is identified.

Alternatively, in one or more of the various embodiments, each bundle may be arranged to include an unencrypted copy of the public key of its associated mapper or reducer. Accordingly, in some embodiments, the public key included in the bundle may be employed as an identifier to allow easier lookups or identification of the bundle, without performing brute-force decryption of the bundles. For example, in some embodiments, public keys may be included in the bundle when there may be such a large number of mappers or reducers that it may be intractable to perform exhaustive decryption to find the corresponding public key. In this example, a mapper or reducer could compare the public key included in each bundle with its own public key to identify which bundle it should try to decrypt with its private key, rather than trying to unencrypt all the bundles exhaustively to find the correct bundle.

In one embodiment, job outputs from one or more other mapper computers are merged with the job output into reducer inputs 808(A)-(B). Reducer inputs 808(A)-(B) are processed by REDUCE function applicators 810(A)-(B), resulting in output parts 810(A)-(B).

Output parts 810(A)-(B) may also be encoded before being stored in file storage 812, thereby being made available for use by the user who initiated the distributed processing.

FIG. 9 illustrates a logical schematic of a portion of system 900, including encryption of a document key by multiple public keys, and distributing the resulting plurality of bundles to each of the mappers in accordance with one or more of the various embodiments. In one or more of the various embodiments, document key 902 is usable to encode and/or decode portions of a data stream. For example, document key 902 may be a symmetric key, usable to encode or decode data.

Mappers 904(A)-(F) (although any number of mappers is similarly contemplated), are in one embodiment associated with distinct public/private key pairs 906(A)-(F) and 908(A)-(F), e.g. RSA or similar types of elliptic curve cryptography public/private key pairs. Having distinct public/private key pairs increases security compared to systems in which key pairs are shared across multiple devices. In shared key systems, a lost or stolen private key compromises an entire system of computers.

In one or more of the various embodiments, document key 902 is encrypted with each of public keys 906(A)-(F). Each encryption results in a bundle, or a portion of a bundle, usable by a mapper computer to extract the document key, which in turn is used to decrypt segments of the data stream (e.g. segments 408 and 410 of data stream 406, as described above in conjunction with FIG. 4). However, in order to eliminate any affinity between data and the mapper computer that processes that data, an aggregation of the resulting bundle 910 is distributed to each of mappers 904(A)-(F). This results in each mapper node being provided the entire set of bundles. Accordingly, in some embodiments, a given mapper node may attempt to decrypt each bundle until it finds the bundle that was encrypted with its public cryptographic key.

In one or more of the various embodiments, each bundle may be arranged to include an unencrypted copy of the public key of its associated mapper or reducer. Accordingly, in some embodiments, the public key included in the bundle may be employed as an identifier to allow easier lookups or identification of the bundle, without performing brute-force decryption of the bundles. For example, in some embodiments, public keys may be included in the bundle when there may be such a large number of mappers or reducers that it may be intractable to perform exhaustive decryption to find the corresponding public key. In this example, a mapper or reducer could compare the public key included in each bundle with its own public key to identify which bundle it should try to decrypt with its private key, rather than trying to unencrypt all the bundles to find the correct bundle.

Bundles are described in more detail above with regard to FIG. 6B, but briefly, the resulting bundle may be one of the plurality of encrypted bundles 622. In one or more of the various embodiments, the resulting bundle may also include, in addition to document key 902, a segment marker 612, and/or segment metadata 700. As discussed above with regard to FIG. 6B, in some embodiments, the plurality of bundles may be embedded in (e.g. added to, appended to) an un-encoded header associated with an encoded segment. Accordingly as described above, each encoded segment may include one or more encrypted bundles, such that there may be an encrypted bundle for each separate cryptographic key used in the system. In some embodiments, if a system uses a single key pair for the entire distributed processing cluster, encoded segment may be arranged to include one encrypted bundle. Likewise, for example, in one or more of the various embodiments, if a system uses ten different key sets, and encoded segment will include ten encrypted bundles—at least one for each cryptographic key used to encrypt the ten different bundles.

Upon receiving bundles 910, each mapper attempts to decrypt each bundle and extract the document key 902 using that mapping computer's private key. In one or more of the various embodiments, as the contents of the bundle are encrypted, there may be no way to identify which bundle was created with which public key, so trial and error may be used to identify and decrypt the appropriate bundle for a given public-private key pair. However, in some embodiments, this type of key decryption is not required if the public keys are included in the set of bundles, either unencrypted or obfuscated.

Generalized Operations

Figure 10:
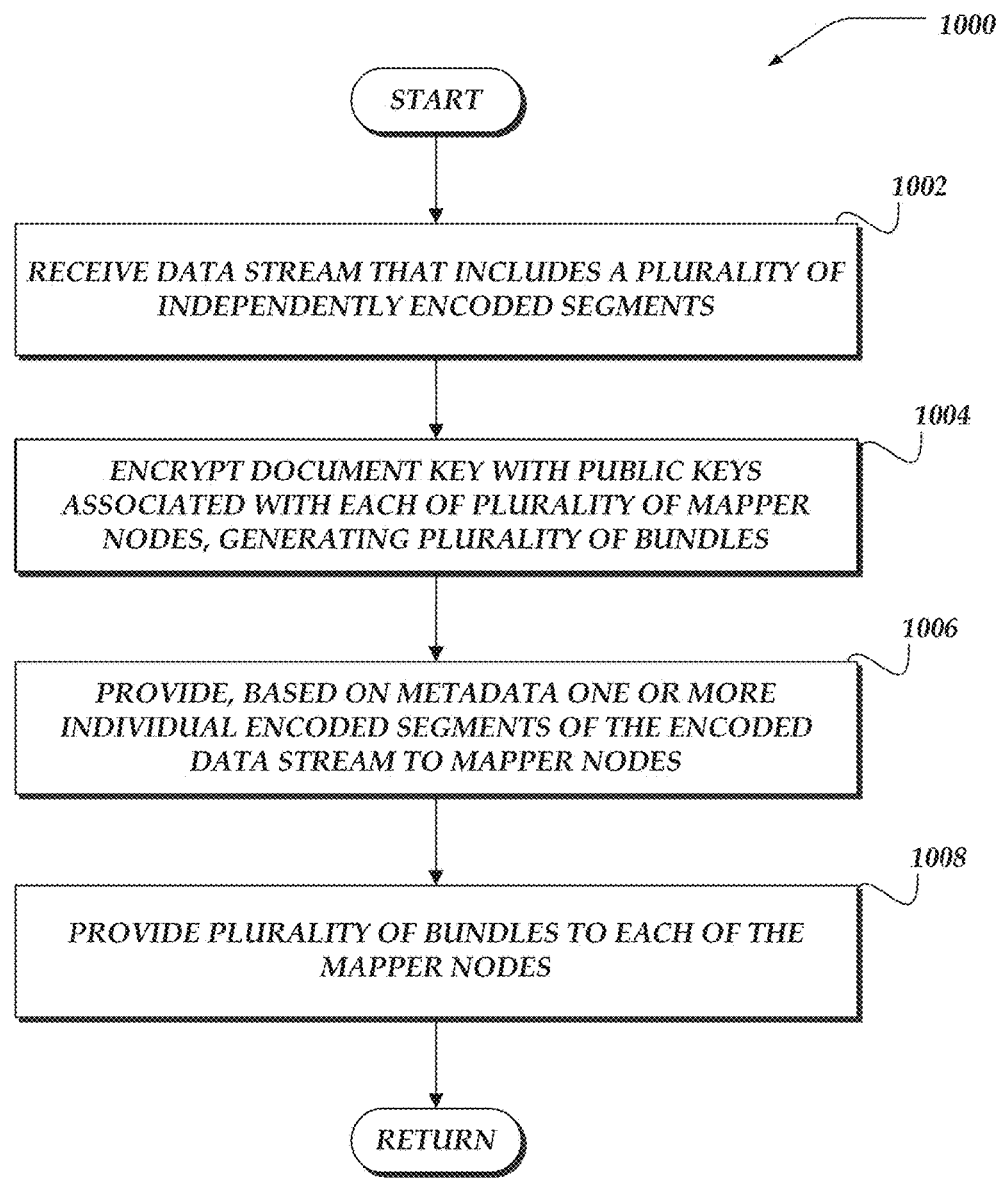
FIG. 10 illustrates an overview flowchart for a process for distributed stream decoding and processing in accordance with one or more of the various embodiments.
Figure 11:
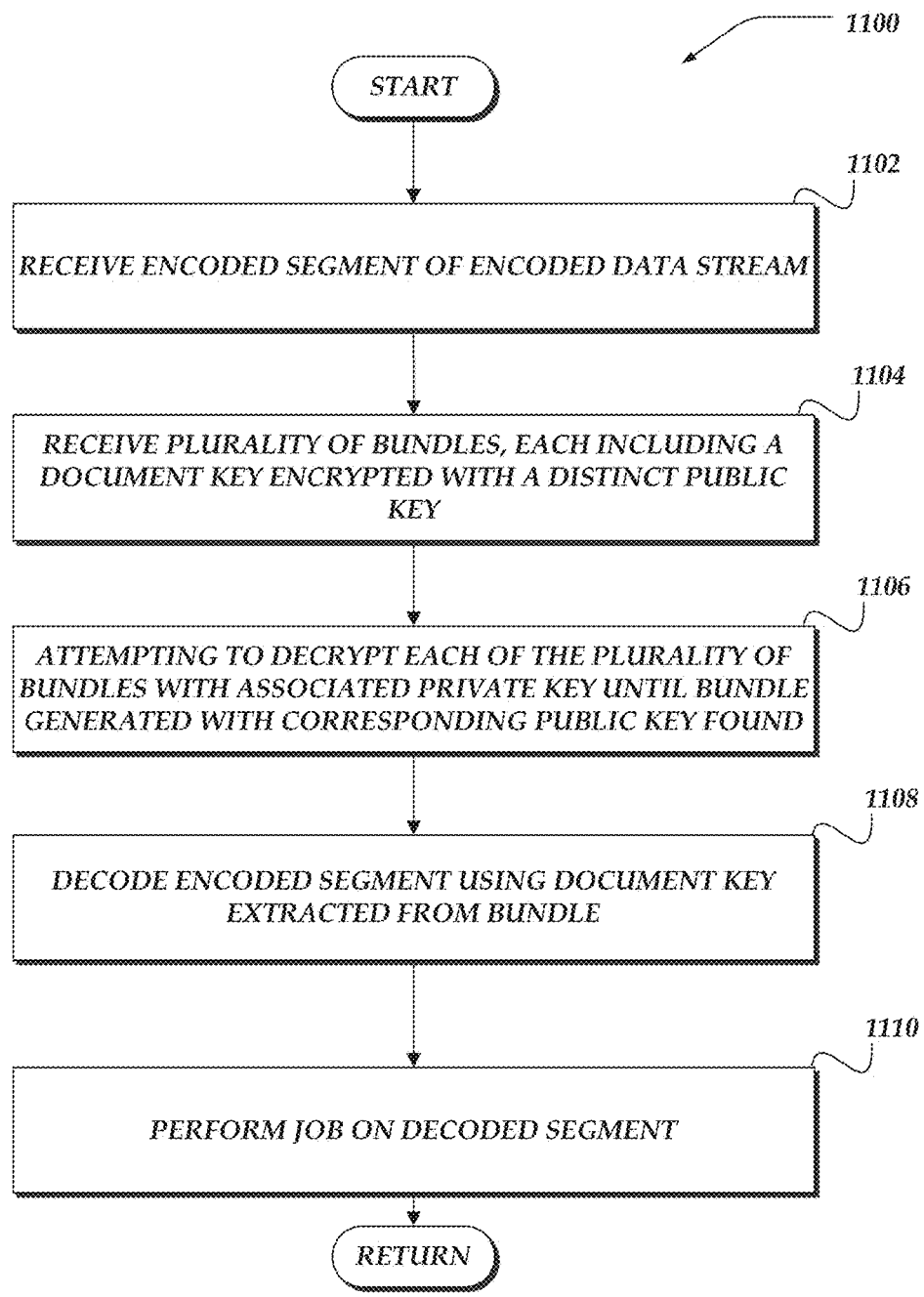
FIG. 11 illustrates an overview flowchart for a process for secure, distributed data stream decoding and job processing in accordance with one or more of the various embodiments.
Figure 12:
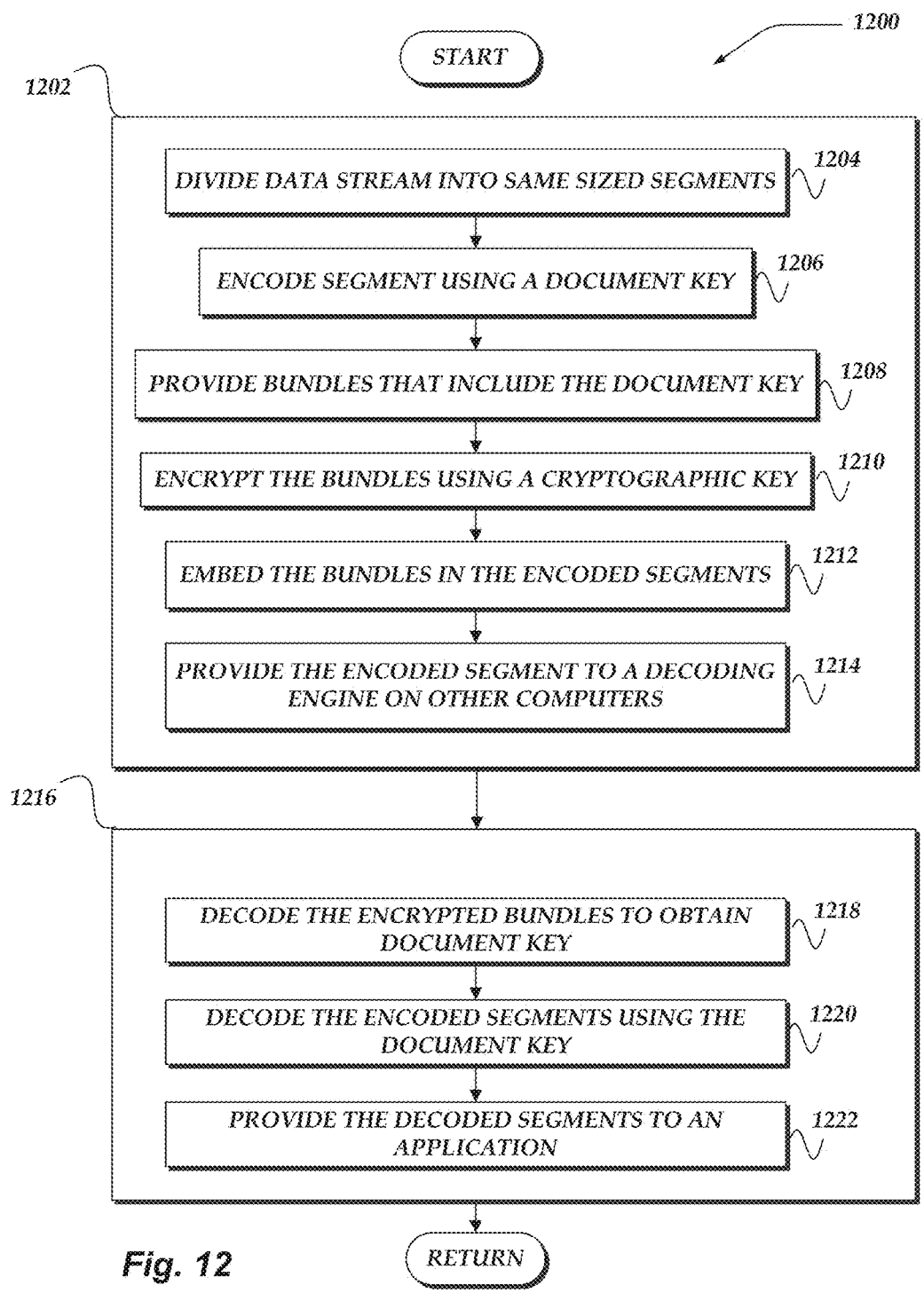
FIG. 12 illustrates an overview flowchart for a process for distributed stream decoding and processing in accordance with one or more of the various embodiments.

FIGS. 10-12 represent the generalized operations for distributed stream decoding and processing in accordance with at least one of the various embodiments. In one or more of the various embodiments, processes 1000, 1100, and 1200 described in conjunction with FIGS. 10-12 may be implemented by and/or executed on a single network computer, such as network computer 300 of FIG. 3. In other embodiments, these processes or portions thereof may be implemented by and/or executed on a plurality of network computers, such as job tracker computer 116 in conjunction with mapper computer 112 of FIG. 1. However, embodiments are not so limited, and various combinations of network computers, client computers, virtual machines, or the like may be utilized. Further, one or more of the various embodiments, the processes described in conjunction with FIGS. 10-12 may be for distributed stream decoding of independent segment portions of a data stream, the encoding of which is described in conjunction with FIGS. 4-9.

FIG. 10 illustrates an overview flowchart for process 1000 for distributed stream decoding and processing in accordance with one or more of the various embodiments. Process 1000 may be implemented and executed by, for example, job tracker computer 116 as depicted by network computer 300 of FIG. 3.

After a start block, at block 1002, in one or more of the various embodiments, a data stream including a plurality of encoded segments is received by job tracker computer 116. In some embodiments, the data stream has been encoded with a sequential encoder to generate, from an input data stream, the plurality of independently encoded segments. In one or more of the various embodiments, the input data stream may be segmented and encoded such that each segment, when decoded, has the same length as every other segment when decoded. In one or more of the various embodiments, encoding includes encrypting, compressing, or encrypting and compressing the data segment.

In one or more of the various embodiments, the encoding engine may include metadata associated with each segment within each segment. Included metadata may include a key, such as a document key, usable to decode the segment. Included metadata may also, as discussed above in conjunction with FIG. 7, include a marker label, an offset position of the encoded segment within the encoded stream, a size of the encoded segment, and a size of the segment when decoded. As described above, this may enable each segment to be decoded separately or independently from other segments or other sources of metadata. Additionally, or alternatively, in one or more of the various embodiments, the metadata generated by the sequential encoder is received separate from the segments.

At block 1004, if a single mapping computer is contemplated, the document key used to encode the encoded segments of the data stream is encrypted with a public key associated with the mapping computer, generating a bundle. Optionally, other portions of metadata associated with (e.g. embedded within) a segment are also encrypted and included in the bundle, such as a marker label, an offset position of the encoded segment within the encoded stream, a size of the encoded segment, and a size of the segment when decoded. In one or more of the various embodiments, the bundle may optionally include the public key of the corresponding mapper or reducer, in case the number of mappers or reducers becomes intractably high, or for custom configurations or other embodiments. When more than one mapping computer is in use, and when two or more of the mapping computers in use are utilizing distinct public/private key pairs, a plurality of bundles is generated by encrypting the contents of the bundle with each of the distinct public keys associated with each of the plurality of mapping computers.

In one or more of the various embodiments, each bundle may be arranged to include an unencrypted copy of the public key of its associated mapper or reducer. Accordingly, in some embodiments, the public key included in the bundle may be employed as an identifier to allow easier lookups or identification of the bundle, without performing brute-force decryption of the bundles. For example, in some embodiments, public keys may be included in the bundle when there may be such a large number of mappers or reducers that it may be intractable to perform exhaustive decryption to find the corresponding public key. In this example, a mapper or reducer could compare the public key included in each bundle with its own public key to identify which bundle it should try to decrypt with its private key, rather than trying to unencrypt all the bundles to find the correct bundle.

In one or more of the various embodiments, rather than providing a separate public key for each mapper or reducer, the system may be arranged such that one or more public keys are shared among more than one mapper, or reducer. In some embodiments, a single key may be used for all mappers or reducers.

At block 1006, splitter 322, as depicted in FIG. 3, provides one or more of the encoded segments of the data stream to one of a plurality of mapper nodes of a MapReduce system. As discussed above in conjunction with block 1002, each segment may include metadata enabling that segment to be decoded separately or independently of other segments or sources of metadata. Segments may be identifiable within the data stream by a "magic string" or codes embedded in the data stream. In one or more of the various embodiments, additionally or alternatively, one or more segments may be identifiable in the data stream based on offsets or labels listed in the metadata.

Once identified, splitter 322 extracts each of the encoded segments from the data stream, and copies each of them to one of the plurality of mapper computers. During this process, each segment maintains its encoding (i.e. each segment is copied without decoding). In this way, decoding of a large data stream can be distributed and performed by the plurality of mapper computers, rather than having to decode the entire large data stream on the job tracker computer.

At block 1008, one or more bundles are provided to each of the mapper nodes. When there is only a single mapper computer in use, or when multiple mapping computers all use the same public/private key pair, a single bundle is provided to the one or more mapping computers. When multiple mapping computers utilize distinct public/private key pairs, a plurality of bundles are provided to each of the mapper computers.

In one or more of the various embodiments, bundles that include encoded document keys, or the like, may be included or embedded in the segments. Accordingly, in one or more of the various embodiments, the bundles may be included in segments similar to embedded metadata. Thus, in some embodiments, the segments may be arranged to include sufficient information so they can be decoded separately or independently from other segments or metadata. Next, in some embodiments, control may be returned to a calling process.

In one or more of the various embodiments, blocks 1004-1008 of process 1000 may also be implemented by mapper computer 112. As discussed above in conjunction with FIG. 8, mapper computer 112 may be arranged to encode job outputs before providing them to reducer computers 114(A)-(B). However, the process of encrypting document keys and other pieces of metadata into a bundle is unchanged, except that bundles are generated using public keys associated with the plurality of reducer computers 114(A)-(B) instead of public keys associated with the plurality of mapper computers 112(A)-(C), and that instead of providing encoded data segments extracted from the received data stream, the encoded output of the mapper job is provided.

FIG. 11 illustrates an overview flowchart for process 1100 for secure, distributed data stream decoding and job processing in accordance with one or more of the various embodiments. In one of the various embodiments, process 1100 is implemented by mapper computer 112.

After a start block, at block 1102, in one or more of the various embodiments, an encoded segment of the data stream is received. Additionally or alternatively, multiple segments of the data stream could be received for decoding and processing.

At block 1104, the plurality of bundles, each including the document key and each encrypted with a distinct public key, is received. As discussed above, a bundle is provided for each distinct public/private key pair used by a mapping computer. In this way, every mapping computer is capable of decrypting the document key, without pre-determining which mapping computer is to receive which bundle. As such, there is no affinity between bundles and mapping computers.

At block 1106, the document key is decrypted. In one of the various embodiments, an attempt is made to decrypt each of the plurality of bundles using the private key associated with the mapper computer. In one of the various embodiments, at least one of the bundles is encrypted with a public key associated with a different mapping computer, and so attempts to extract the document key from these bundles will be unsuccessful. However, by attempting to decrypt each of the plurality of bundles in turn, through trial and error, the bundle generated with the public key associated with the mapper computer will be identified.

In one or more of the various embodiments, each bundle may be arranged to include an unencrypted copy of the public key of its associated mapper or reducer. Accordingly, in some embodiments, the public key included in the bundle may be employed as an identifier to allow easier lookups or identification of the bundle, without performing brute-force decryption of the bundles. For example, in some embodiments, public keys may be included in the bundle when there may be such a large number of mappers or reducers that it may be intractable to perform exhaustive decryption to find the corresponding public key. In this example, a mapper or reducer could compare the public key included in each bundle with its own public key to identify which bundle it should try to decrypt with its private key, rather than trying to unencrypt all the bundles to find the correct bundle.

For example, in some embodiments, each bundle may include the document key and a known tag or marker value. Accordingly, the document key and the marker value may be encrypted together to provide an encrypted bundle. Thus, after a mapper attempts to decrypt a bundle with its own private key, it can compare the resulting marker value with the known marker value to determine if the document key has been successfully decrypted. E.g., in some embodiments, encoding a bundle may be as follows: B=E(K1, (DK:M)) where B is the encrypted bundle, K1 is a public key corresponding to a mapper and (DK:M) is the document key appended by the known marker value, and E is the process Z=E(K1, X), that encrypts X to Z using private key K1. Similarly, decoding may be as follows: (DK:M)=D(K2, B) where K2 is a private key corresponding to the mapper, B is the encrypted bundle, and (DK:M) is the decrypted bundle that includes the document key appended by the known marker value. Thus, in this example, if the marker value is correct, the mapper computer may determine that it has decoded the correct bundle. Because, if mismatched keys are used to decrypt a bundle (e.g., it was encoded using a public key corresponding to another mapper), the marker value will be random numbers that will not match the expected known marker value.

At block 1108, the document key is extracted from the bundle encrypted with the mapping computer's public key. At block 1110, the decoded segment is applied to the job to be performed. Next, in some embodiments, control may be returned to a calling process.

In one or more of the various embodiments, process 1100 may also be implemented by reducer computer 114. As discussed above in conjunction with FIG. 8, mapper computers may encode job outputs before providing them to reducer computers 114(A)-(B). However, the process of encrypting document keys is unchanged, except that bundles are generated using public keys associated with the plurality of reducer computers 114(A)-(B) instead of public keys associated with mapper computers 112(A)-(C).

FIG. 12 illustrates an overview flowchart for process 1200 for distributed stream decoding and processing in accordance with one or more of the various embodiments. In some embodiments, process 1200 may be implemented and executed by, for example, job tracker computer 116 as depicted by network computer 300 of FIG. 3. After a start block, at block 1202, an encoding engine may be employed to perform various actions described below. At block 1204, in one or more of the various embodiments, a data stream may be divided into one or more of segments that have the same size. At block 1206, in one or more of the various embodiments, the one or more segments may be decoded using a document key. At block 1208, in one or more of the various embodiments, one or more bundles that each include the document key may be provided. At block 1210, in one or more of the various embodiments, the one or more bundles may be encrypted using one or more cryptographic keys that may be separate from the document key, such that each of the one or more cryptographic keys may be associated with one or more application engines. At block 1212, in one or more of the various embodiments, the one or more encrypted bundles may be embedded into each of the one or more encoded segments. At block 1214, in one or more of the various embodiments, the one or more encoded segments may be provided to one or more other network computers that each include a decoding engine and an application engine. At block 1216, in one or more of the various embodiments, the decoding engine may be employed to perform further actions. At block 1218, in one or more of the various embodiments, the one or more encrypted bundles may be decrypted to obtain the document key for each encoded segment provided to the one or more other network computers. At block 1220, in one or more of the various embodiments, one or more encoded segments may be decoded using the document key, such that the one or more decoded segments are the same size as the one or more segments prior to encoding. At block 1222, in one or more of the various embodiments, each decoded segment may be provided to the application engine for further processing by an application. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing data streams using a network computer that performs actions, comprising:
   employing an encoding engine to perform further actions, including:
      dividing a data stream into one or more segments that have the same size;
      encoding the one or more segments using a document key;
      providing one or more bundles that each include the document key;
      encrypting the one or more bundles using one or more cryptographic keys that are separate from the document key, wherein each of the one or more cryptographic keys are associated with one or more application engines; and
      embedding the one or more encrypted bundles into each of the one or more encoded segments;
      providing the one or more encoded segments to one or more other network computers that each include a decoding engine and an application engine; and
   employing the decoding engine to perform further actions, including:
      decrypting the one or more encrypted bundles to obtain the document key for each encoded segment provided to the one or more other network computers;
      decoding the one or more encoded segments using the document key, wherein the one or more decoded segments are the same size as the one or more segments prior to encoding; and
      providing each decoded segment to the application engine for further processing by an application.

2. The method of claim 1, wherein decrypting the one or more encrypted bundles, further comprises:
   decrypting each of the one or more encrypted bundles on each of the one or more other computers using a cryptographic key that is associated with the one or more other computers; and
   providing the document key from the one or more decrypted bundles that is decrypted using the cryptographic key.

3. The method of claim 1, wherein the encoding of the one or more segments, further comprises, employing a sequential encoder to separately encode the one or more segments.

4. The method of claim 1, further comprising, providing the data stream to one or more mapper nodes in a distributed processing cluster, wherein each mapper node includes the encoding engine and a mapping engine.

5. The method of claim 1, wherein providing the one or more encoded segments to the one or more other network computers, further comprises:
   employing a mapping engine to select the one or more other network computers; and
   employing the mapping engine to provide the one or more encoded segments to the one or more other network computers.

6. The method of claim 1, wherein encoding the one or more segments, further comprises, one or more of compressing the one or more segments, encrypting the one or more segments, compressing then encrypting the one or more segments, or compressing and encrypting the one or more segments.

7. The method of claim 1, wherein the one or more other network computers are one or more reducer nodes in a distributed processing cluster and the application engine is a reducer engine.

8. The method of claim 1, further comprising, employing the encoding engine to include a public key that is associated with the one or more other network computers that is associated with the one or more cryptographic keys used to encrypt each bundle, wherein the public key enables each bundle to be matched to its associated other network computer.

9. A system for managing data streams, comprising:
   a network computer, comprising:
      a transceiver that communicates over the network;
      a memory that stores at least instructions; and
      one or more processor devices that execute instructions that perform actions, including:
         employing an encoding engine to perform further actions, including:
            dividing a data stream into one or more segments that have the same size;
            encoding the one or more segments using a document key;
            providing one or more bundles that each include the document key;
            encrypting the one or more bundles using one or more cryptographic keys that are separate from the document key, wherein each of the one or more cryptographic keys are associated with one or more application engines; and embedding the one or more encrypted bundles into each of the one or more encoded segments;

providing the one or more encoded segments to one or more other network computers that each include a decoding engine and an application engine; and another network computer, comprising:
a transceiver that communicates over the network;
a memory that stores at least instructions; and
one or more processor devices that execute instructions that perform actions, including:
employing the decoding engine to perform further actions, including:
decrypting the one or more encrypted bundles to obtain the document key for each encoded segment provided to the one or more other network computers;
decoding the one or more encoded segments using the document key, wherein the one or more decoded segments are the same size as the one or more segments prior to encoding; and
providing each decoded segment to the application engine for further processing by an application.

10. The system of claim 9, wherein decrypting the one or more encrypted bundles, further comprises:
decrypting each of the one or more encrypted bundles on each of the one or more other computers using a cryptographic key that is associated with the one or more other computers; and
providing the document key from the one or more decrypted bundles that is decrypted using the cryptographic key.

11. The system of claim 9, wherein the encoding of the one or more segments, further comprises, employing a sequential encoder to separately encode the one or more segments.

12. The system of claim 9, further comprising, providing the data stream to one or more mapper nodes in a distributed processing cluster, wherein each mapper node includes the encoding engine and a mapping engine.

13. The system of claim 9, wherein providing the one or more encoded segments to the one or more other network computers, further comprises:
employing a mapping engine to select the one or more other network computers; and
employing the mapping engine to provide the one or more encoded segments to the one or more other network computers.

14. The system of claim 9, wherein encoding the one or more segments, further comprises, one or more of compressing the one or more segments, encrypting the one or more segments, compressing then encrypting the one or more segments, or compressing and encrypting the one or more segments.

15. The system of claim 9, wherein the one or more other network computers are one or more reducer nodes in a distributed processing cluster and the application engine is a reducer engine.

16. The system of claim 9, further comprising, employing the encoding engine to include a public key that is associated with the one or more other network computers that is associated with the one or more cryptographic keys used to encrypt each bundle, wherein the public key enables each bundle to be matched to its associated other network computer.

17. A processor readable non-transitory storage media that includes instructions for managing data streams, wherein execution of the instructions by one or more hardware processors performs actions, comprising:
employing an encoding engine to perform further actions, including:
dividing a data stream into one or more segments that have the same size;
encoding the one or more segments using a document key;
providing one or more bundles that each include the document key;
encrypting the one or more bundles using one or more cryptographic keys that are separate from the document key, wherein each of the one or more cryptographic keys are associated with one or more application engines; and
embedding the one or more encrypted bundles into each of the one or more encoded segments;
providing the one or more encoded segments to one or more other network computers that each include a decoding engine and an application engine; and
employing the decoding engine to perform further actions, including:
decrypting the one or more encrypted bundles to obtain the document key for each encoded segment provided to the one or more other network computers;
decoding the one or more encoded segments using the document key, wherein the one or more decoded segments are the same size as the one or more segments prior to encoding; and
providing each decoded segment to the application engine for further processing by an application.

18. The media of claim 17, wherein decrypting the one or more encrypted bundles, further comprises:
decrypting each of the one or more encrypted bundles on each of the one or more other computers using a cryptographic key that is associated with the one or more other computers; and
providing the document key from the one or more decrypted bundles that is decrypted using the cryptographic key.

19. The media of claim 17, wherein the encoding of the one or more segments, further comprises, employing a sequential encoder to separately encode the one or more segments.

20. The media of claim 17, further comprising, providing the data stream to one or more mapper nodes in a distributed processing cluster, wherein each mapper node includes the encoding engine and a mapping engine.

21. The media of claim 17, wherein providing the one or more encoded segments to the one or more other network computers, further comprises:
employing a mapping engine to select the one or more other network computers; and
employing the mapping engine to provide the one or more encoded segments to the one or more other network computers.

22. The media of claim 17, wherein encoding the one or more segments, further comprises, one or more of compressing the one or more segments, encrypting the one or more segments, compressing then encrypting the one or more segments, or compressing and encrypting the one or more segments.

23. The media of claim 17, wherein the one or more other network computers are one or more reducer nodes in a distributed processing cluster and the application engine is a reducer engine.

24. A network computer for managing data streams, comprising:
 a transceiver that communicates over the network;
 a memory that stores at least instructions; and
 one or more processor devices that execute instructions that perform actions, including:
  employing an encoding engine to perform further actions, including:
   dividing a data stream into one or more segments that have the same size;
   encoding the one or more segments using a document key;
   providing one or more bundles that each include the document key;
   encrypting the one or more bundles using one or more cryptographic keys that are separate from the document key, wherein each of the one or more cryptographic keys are associated with one or more application engines; and
   embedding the one or more encrypted bundles into each of the one or more encoded segments;
   providing the one or more encoded segments to one or more other network computers that each include a decoding engine and an application engine; and
  employing the decoding engine to perform further actions, including:
   decrypting the one or more encrypted bundles to obtain the document key for each encoded segment provided to the one or more other network computers;
   decoding the one or more encoded segments using the document key, wherein the one or more decoded segments are the same size as the one or more segments prior to encoding; and
   providing each decoded segment to the application engine for further processing by an application.

25. The network computer of claim 24, wherein decrypting the one or more encrypted bundles, further comprises:
 decrypting each of the one or more encrypted bundles on each of the one or more other computers using a cryptographic key that is associated with the one or more other computers; and
 providing the document key from the one or more decrypted bundles that is decrypted using the cryptographic key.

26. The network computer of claim 24, wherein the encoding of the one or more segments, further comprises, employing a sequential encoder to separately encode the one or more segments.

27. The network computer of claim 24, further comprising, providing the data stream to one or more mapper nodes in a distributed processing cluster, wherein each mapper node includes the encoding engine and a mapping engine.

28. The network computer of claim 24, wherein providing the one or more encoded segments to the one or more other network computers, further comprises:
 employing a mapping engine to select the one or more other network computers; and
 employing the mapping engine to provide the one or more encoded segments to the one or more other network computers.

29. The network computer of claim 24, wherein encoding the one or more segments, further comprises, one or more of compressing the one or more segments, encrypting the one or more segments, compressing then encrypting the one or more segments, or compressing and encrypting the one or more segments.

30. The network computer of claim 24, wherein the one or more other network computers are one or more reducer nodes in a distributed processing cluster and the application engine is a reducer engine.

* * * * *